United States Patent [19]

Newnan

[11] Patent Number: 5,241,898

[45] Date of Patent: Sep. 7, 1993

[54] COFFEE DISPENSER AND BREWER APPARATUS

[75] Inventor: Brian D. Newnan, Louisville, Ky.

[73] Assignee: Grindmaster Corporation, Louisville, Ky.

[21] Appl. No.: 951,674

[22] Filed: Sep. 25, 1992

[51] Int. Cl.$^5$ .............................................. A47J 31/42
[52] U.S. Cl. ...................... 99/280; 99/285; 99/286; 99/287; 99/289 R; 99/300; 241/100; 241/225
[58] Field of Search .............. 99/286, 280, 281, 282, 99/283, 285, 287, 289 R, 290, 300, 299, 302 R, 304, 305; 426/433; 241/100, 222, 225

[56] References Cited

U.S. PATENT DOCUMENTS

| | | | |
|---|---|---|---|
| 2,827,845 | 3/1958 | Richeson | 99/289 |
| 3,247,778 | 4/1966 | Davis | 99/282 |
| 4,188,863 | 2/1980 | Grossi | 99/286 |
| 4,493,249 | 1/1985 | Stover | 99/275 |
| 4,624,177 | 11/1986 | Ito | 99/286 |
| 4,815,633 | 3/1989 | Kondo et al. | 222/129 |
| 4,841,849 | 6/1989 | Shimomura | 99/286 |
| 4,858,522 | 8/1989 | Castelli | 99/280 |
| 4,876,953 | 10/1989 | Imamura et al. | 99/280 |
| 5,083,502 | 1/1992 | Enomoto | 99/286 |

*Primary Examiner*—Robert W. Jenkins
*Attorney, Agent, or Firm*—Vance A. Smith

[57] ABSTRACT

A coffee dispensing and brewing apparatus in accordance with one embodiment of the present invention comprises components for dispensing a predetermined amount of coffee to a brew basket, the components including a hopper for holding a supply of coffee beans and an auger device communicating with the hopper for portioning coffee beans in a predetermined amount to a coffee grinder. The apparatus further includes a brew basket holding assembly for releasably holding the brew basket in a region adjacent a passageway to the grinder and a hot water making and delivery system for distributing a predetermined volume of hot water from a hot water holding tank to the region during a brewing cycle. The grinder motor has a right angle power transmission that couples the motor to the grinder with the motor being located below the grinder and adjacent a vertical side of the holding tank.

46 Claims, 13 Drawing Sheets

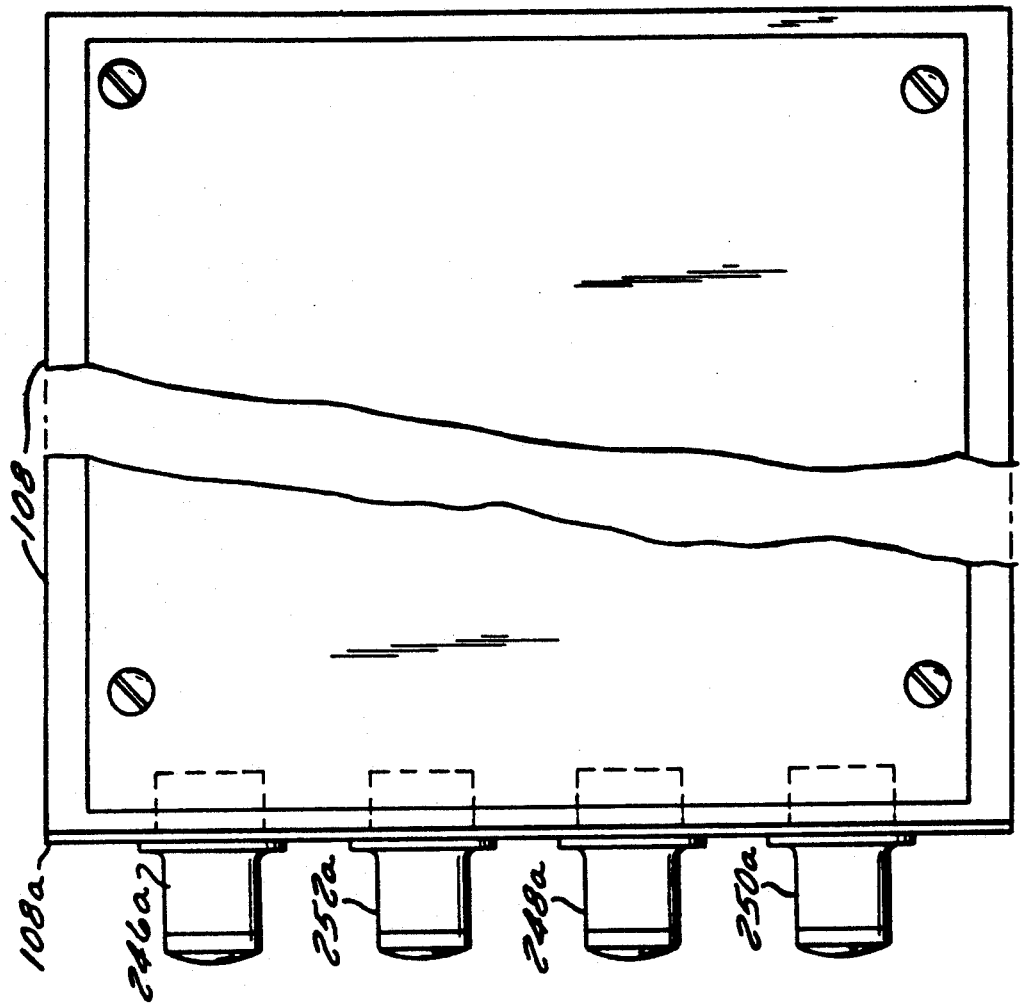
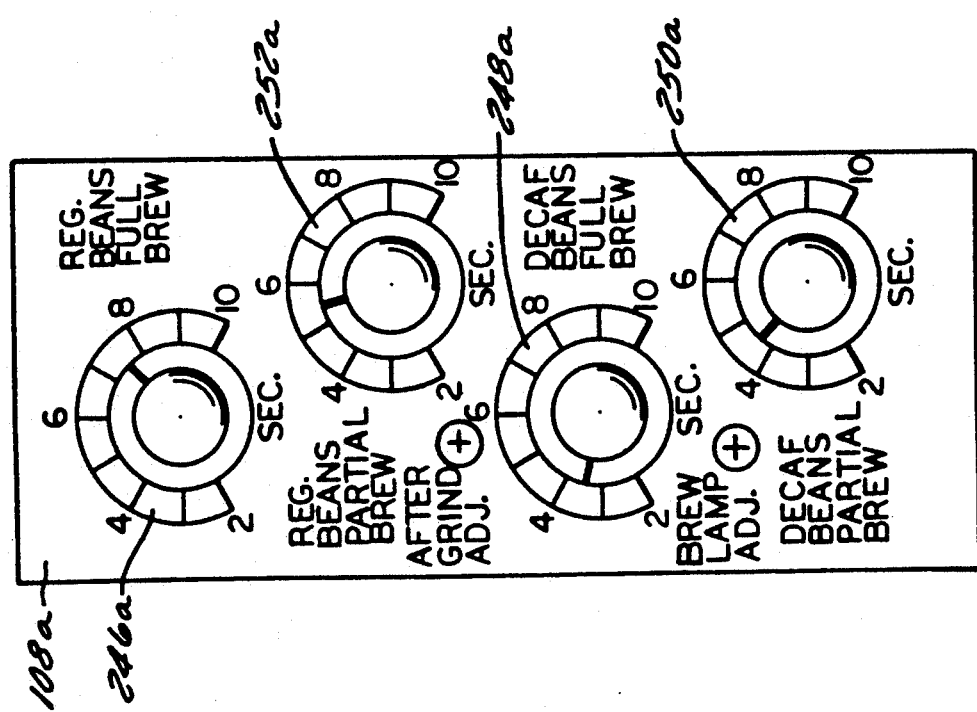

COFFEE DISPENSER AND BREWER APPARATUS

BACKGROUND OF THE INVENTION

This invention relates to a coffee dispenser and brewer apparatus and, more particularly, to a multi-hopper coffee dispenser and brewer apparatus with a coffee portioning component capable of delivering various types and amounts of coffee to a brew basket and a hot water delivery component capable of distributing corresponding volumes of hot water to the brew basket and a control system therefor.

Coffee dispensing and brewing systems are found in many forms providing many functions. Some systems provide for the automatic brewing of ground coffee packaged in a predetermined quantity manually placed in a brewing chamber. A predetermined volume of hot water is delivered to the brewing chamber once a start switch is closed to initiate the brewing cycle.

Still other systems meter predetermined portions of ground coffee from a hopper to the brewing chamber followed by a delivery of a predetermined volume of hot water to the chamber. Such systems typically use a slide valve arrangement to meter the ground coffee to the brewing chamber. More sophisticated systems of this type may employ multi-hopper arrangements with each hopper containing a different type of ground coffee and allows the user to chose the kind of coffee to be brewed. Other systems allow the user to manually control the amount of ground coffee and volume of hot water delivered to the brewing chamber.

Still another coffee dispensing and brewing system finding increasing acceptance with households, restaurants and the vending machinery industry combines a coffee portioner, grinder and brewer into an integrated system. A major reason for the popularity of this type of system is due to the increasing sophistication of the coffee consumer who dictates that brewed coffee be as fresh as possible, thus requiring the grinding of the beans be as close as possible in time and location to the brewer. Additionally, it is desirable that the coffee be measured accurately from throw to throw to provide a consistency to the brewed beverage.

Finally, any combination grinder brewer should be able to accommodate different coffee beverages, e.g., caffeinated and decaffeinated beverages, and the use of specially treated and/or flavored coffee. Flavored coffee is often permeated with substances, sticky to handle, which may gum up the interior working parts of the coffee transporting and/or grinding components of the apparatus.

To provide a system that permits combining the features mentioned above into a single unit, however, is not an easy task. For example, a commercially acceptable coffee dispenser and brewer system must be compact enough to sit on counters side-by-side with other equipment. Accommodating this space limitation requires judicious and creative use of components. Despite the compactness requirements, the system components must be easily accessible for cleaning, adjustment and repair.

Still another requirement is that the system be "user friendly", such as permitting a user to select different volumes of brewed coffee and different types of brewed beverage. This requirement involves not only proportioning of ground coffee or coffee beans, but matching appropriate volumes of water to be used with the selected amounts of ground coffee. Where multiple hoppers are involved, the problem of meeting this requirement becomes further complicated. Still other desirable user friendly attributes are simplicity in controls and energy efficient operation.

In many environments where coffee beans are metered, ground and then brewed, it is aesthetical pleasing for the operator and consumers, when in the presence of such a system, to be able to visually observe the coffee beans within the system, i.e., in a hopper, even when the supply of the beans is low. For gravity feeding hoppers mounted in the upper portions of a system, this visual display poses a problem when the bean level falls below the hopper windows.

Because many of the components of a complex coffee dispenser and brewer systems consume electrical power, it is essential that the total system be compatible with the electrical power supply limitations. The logic of the circuitry must accommodate peak power demands to avoid exceeding the limitations.

The prior art mechanisms have not been found to be particularly helpful in meeting the requirements above. U.S. Pat. No. 2,827,845 to Richson discloses a very complex grinder-brewer in which the beans are metered into a grinder by a slide valve arrangement. Once grounded, the coffee grounds are fed into a temporary stage area and than delivered into a container where brewing occurs. This system is complex and typifies prior art systems of that time period.

Another type of grinder brewer is set forth in U.S. Pat. No. 3,247,778 to D. F. Davis. A top mounted hopper serves as a bean storage volume for gravity feed via a measuring compartment through slide valves into a grinder and by another set of slide valves into a brewing chamber.

U.S. Pat. No. 4,188,863 to Grossi describes a grinder-brewer combination in which coffee is grounded and a metering device delivers ground coffee to a removable chute which directs the coffee grounds to a filter carried by a fixed filter carrier.

The prior references above disclose coffee dispensers and brewer apparatus that lack the compactness and versatility to provide for the desired features set forth. For example, the grinder motors are large in proportion to the apparatus and there is no accommodation for brewing different types of coffee. While the Davis patent does consider the concept of brewing 12 or 24 cups of coffee, it does not accomplish this in the context of multiple hoppers and different types of beans.

Co-pending U.S. Application Ser. No. 07/816,749 filed Jan. 2, 1992 and assigned to the same assignee as the present invention describes a coffee bean transporting system using one or more augers to move coffee beans from a hopper to a grinding mechanism. As set forth in the co-pending application, all prior art patents using augers in coffee brewing apparatus were concerned with moving coffee grounds to a brewing container. For example, U.S. Pat. No. 4,688,474 to Anderl describes a system of augers and associated coffee ground containers. U.S. Pat. No. 4,493,249 to Stover discloses an auger mechanism for moving baked or freeze dried coffee material. Applicant, however, is unaware of the use of augers by the industry to move coffee beans. Part of the reason for the absence of auger transporting mechanisms are the problems associated with handling coffee beans largely solved by the apparatus set forth in Co-pending Application Ser. No. 07/816,749. Each associated use of multi auger mechanisms with an individual hopper pose still further problems due to the size constraints on the system. Slide valve arrangements opening and shutting chutes leading from the hoppers to other components in the apparatus are admirably suitable where space is a premium and where the coffee is free flowing. But where the coffee proves to be sticky and not easily moved or the amount of material to be metered is small, slide valve metering arrangements become increasingly less effective.

In many instances it is desirable to deliver two different volumes of beans to a grinder and corresponding volumes of hot water to a brewer. U.S. Pat. No. 4,858,522 to Castelli discloses the delivery of two separate volumes of ground coffee and manually provides a control knob for controlling the water. This patent is in the context of an espresso coffee maker and is devoid of any relevant teaching pertaining to the delivery of varying amount of beans to a grinder, particularly in the context of a multi-hopper, multi-delivery system. However, U.S. Pat. No. 4,815,633 to Kondo et al describes a vending machine having multiple hoppers which allows a customer to select the type of coffee desired and the concentration thereof. There is no description of a function for discharging different amounts of powder, much less discharging different amounts of beans, from a particular hopper with corresponding hot water. The prior art apparently has not concerned itself with the concept of metering multiple predetermined amounts of ground coffee from selected hoppers and automatically matching this with an appropriate amount of water, much less accomplishing this in the context of accurately metering, i.e., "portioning", coffee beans and grinding the coffee beans in the same apparatus.

Energy efficiency complimenting effective grinding of coffee beans and heating of the water for subsequent brewing operations is a desirable attribute in combination systems. U.S. Pat. No. 4,841,849 to Shimomura et al and U.S. Pat. No. 4,876,953 to Imamura et al both describe sequential grinding and heating operations in that heating occurs following the grinding cycle. Thus, the grinder and heater do not draw electrical energy simultaneously. Other typical prior art grinder-brewers, have the grinder motor operating when the heater is also energized. In most instances, this places an upper limit upon the size of the grinders motor or the wattage of the heating element or both that can be conveniently used, particularly with 120 volt AC. Yet in some instances stalling in the grinding operation may occur when small, less powerful grinding motors are used. It would be desirable, however, to have a combination system which permits the use of grinder motor of sufficient grinding power and a heating element of sufficient wattage that together with the heater would ordinarily exceed the power limit imposed by an ordinary 120 volt AC source.

It is therefore an object of the present invention to provide a coffee portioner and brewer apparatus that combines in a single unit many of the desired functionally attributes found in separate units without sacrificing the requirements of limited space and user friendliness.

It is another object of the present invention to provide for a coffee portioner and brewer apparatus capable of handling a plurality of different types of coffee;

It is a further object of the present invention to provide for a coffee portioner and brewer apparatus capable of providing a variation in both the volume of coffee metered to the brewer from selected alternate coffee sources and the amount of water used in the brewing cycle;

It is a still further object of the present invention to provide for a portioner and brewer apparatus capable of portioning coffee which can handle specially flavored coffee;

It is still another object of the present invention to provide a coffee portioner and brewer apparatus which is compact in size, yet can accommodate cleaning and maintenance.

It is yet another object of the present invention to provide a coffee portioner and brewer apparatus capable of sufficient grinding power and heating even when limited by the available electrical power source.

SUMMARY OF THE PRESENT INVENTION

In accordance with one embodiment of the present invention a coffee dispensing and brewing apparatus comprises a multi-hopper, a coffee transporting means for metering predetermined amounts of coffee from a selected hopper to a brew basket, and a hot water making and delivery means for subsequently distributing a predetermined volume of hot water in a amount corresponding to the predetermined amount of coffee. A control means determines the sequence and timing of delivery of the coffee and water. In accordance with still another embodiment of the present invention, the apparatus is capable of providing full or partial brews of coffee on demand of the operator or brew. Still another embodiment permits the user to select either the brewing of freshly ground coffee from beans transported to a grinder or the brewing of coffee directly from a predetermined amount of ground coffee placed manually in the brew basket. Other embodiments will be made clear from a reading of the detailed description along with appended drawing.

BRIEF DESCRIPTION OF THE DRAWING

FIGS. 10 and FIG. 10A are, respectively, a front and side view of the timer control panel positioned within the hot water tank housing;

DETAILED DESCRIPTION OF THE PREFERRED EMBODIMENT

Figure 1:
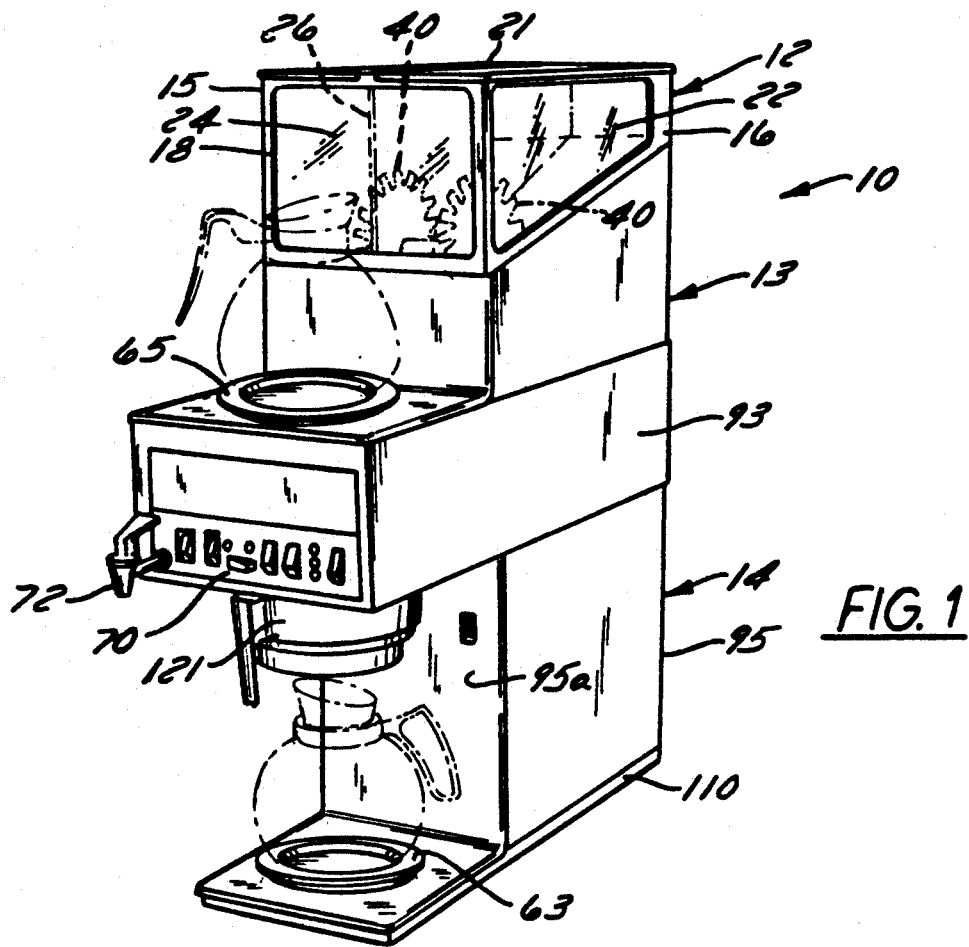
FIG. 1 is a perspective view of a combination multiple hopper, auger coffee bean portioner, grinder and brewer apparatus in accordance with the present invention.
Figure 5:
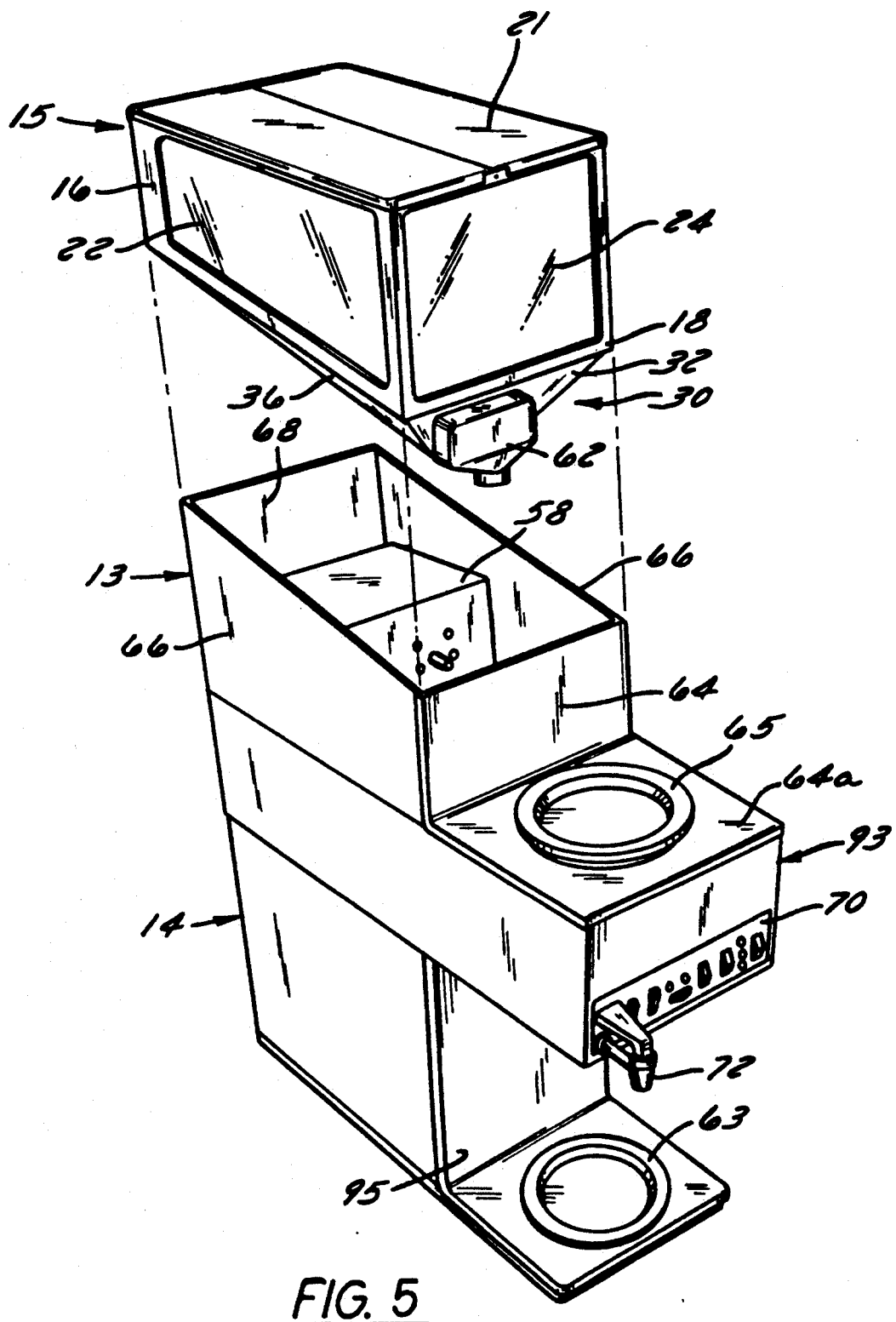
FIG. 5 is a perspective view of the apparatus of FIG. 1 in which the hopper housing is exploded above the auger motor housing and the hot water tank housing.

Reference is made to FIGS. 1 and 5 to illustrate the outward appearance of the modularity of the present invention. As depicted in perspective, the apparatus 10 of the present invention may be visualized for the sake of convenience as being formed in three housings termed, respectively, shown generally as hopper housing 12, hopper support housing 13, and tank housing 14. While the respective housings are shown as separable and in modular form, the various housings could be formed integrally as well. The modularity provides considerable convenience for cleaning and maintenance while making the sections integral may provide a cost advantage.

Hopper housing 12 has a top section 15 generally defined by vertically disposed, parallel side walls 16 and vertically disposed, parallel front and back walls 18 and 20 with bifurcated hinged tops 21. Side walls contain windows 22 made of a transparent material such as heavy polycarbonate that slope toward the front transparent window 24 made of similar material. A dividing wall 26 (shown in phantom in FIG. 1) bifurcates the upper section into two separate volumes or hoppers 28. Hopper housing 12 has a lower section 30 generally integral with upper section 15. Lower section 30 is effectively hidden from view when assembled in place as illustrated in FIG. 1, but may be seen in the perspective of FIG. 5 and various sectional views in FIGS. 4, 7 and 7A. Section 30 has inwardly converging front wall 32, back wall 34, and outer sidewalls 36 that together with inwardly diverging inner walls 37 form a funnel directed toward an opening into an auger element housing (shown generally a character numeral 38) integral with the walls. Auger housing 38 is defined by integral walls 32, 34, 36 and 37 capped by a curved bottom wall 39. Section 30 provides a funneling effect of the coffee beans from a hopper into auger housing 38 integral with section 30.

Figure 7:
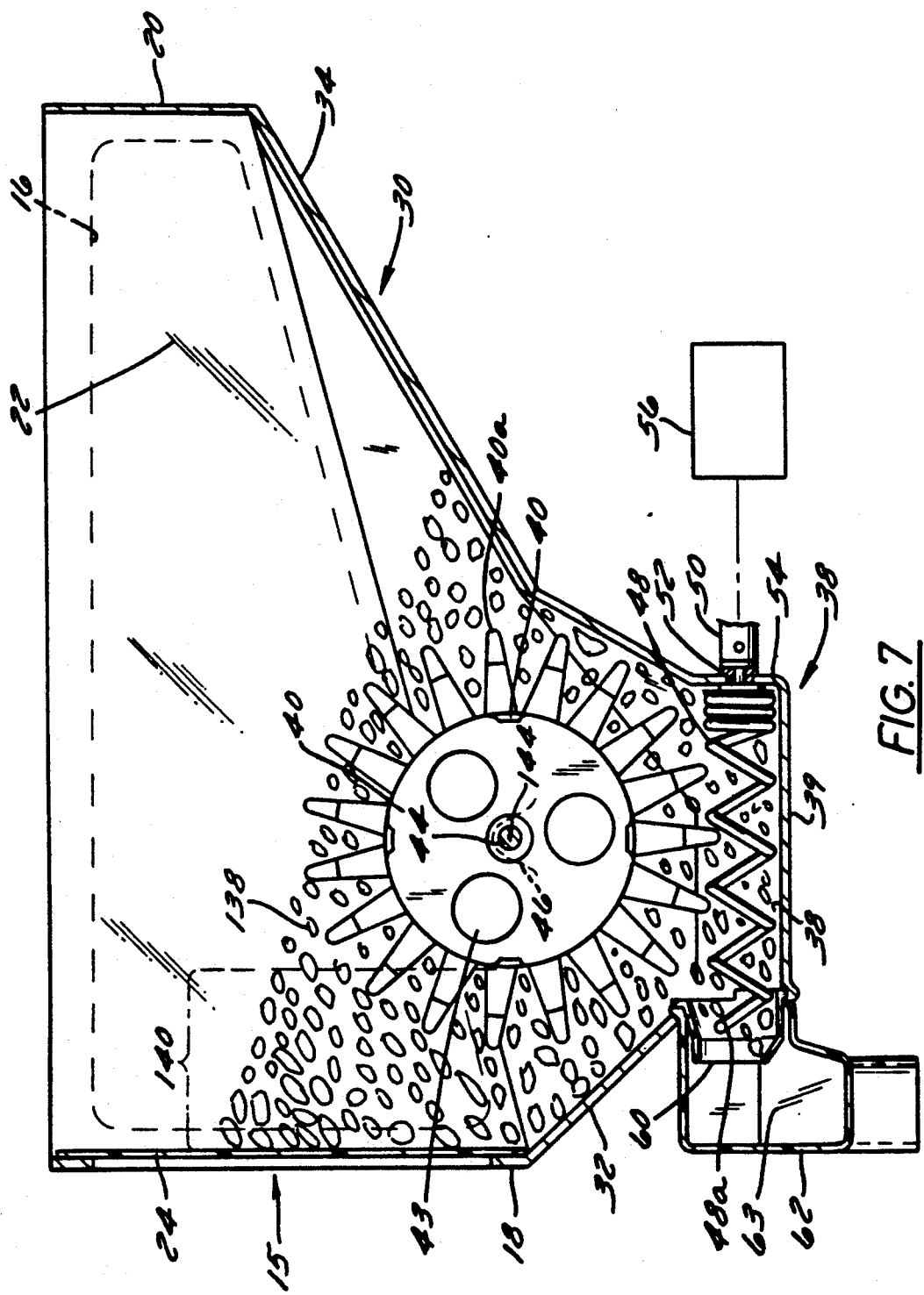
FIG. 7 is a side sectional view of the hopper housing.
Figure 7A:
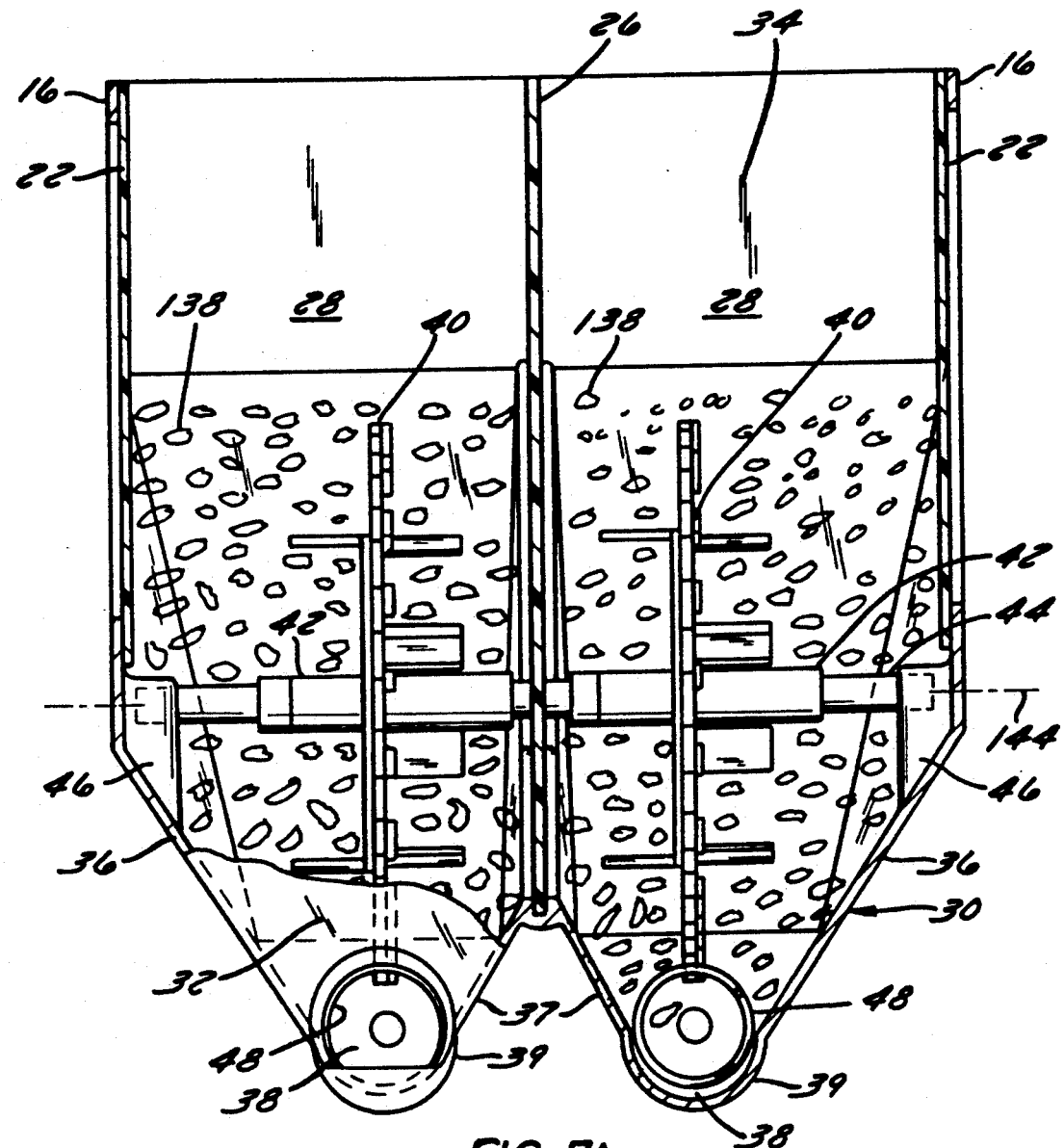
FIG. 7A is a front sectional view of the hopper housing on FIG. 7.

A pair of agitator wheels 40 are mounted on sleeves 42 which rotatably slide over axles 44 as best seen in FIG. 7A. Axles 44 are secured at their distal ends to brackets 46 mounted at the boundary of side walls 16 with sidewalls 36. Wheels 40 are provided with radially extending teeth 41 and axially extending projections 43. It should be noted that the agitator wheels 40 and the funnel shape defined by lower section 30 are located toward the front of the upper housing 12. The purpose of this positioning is discussed below.

Figure 4:
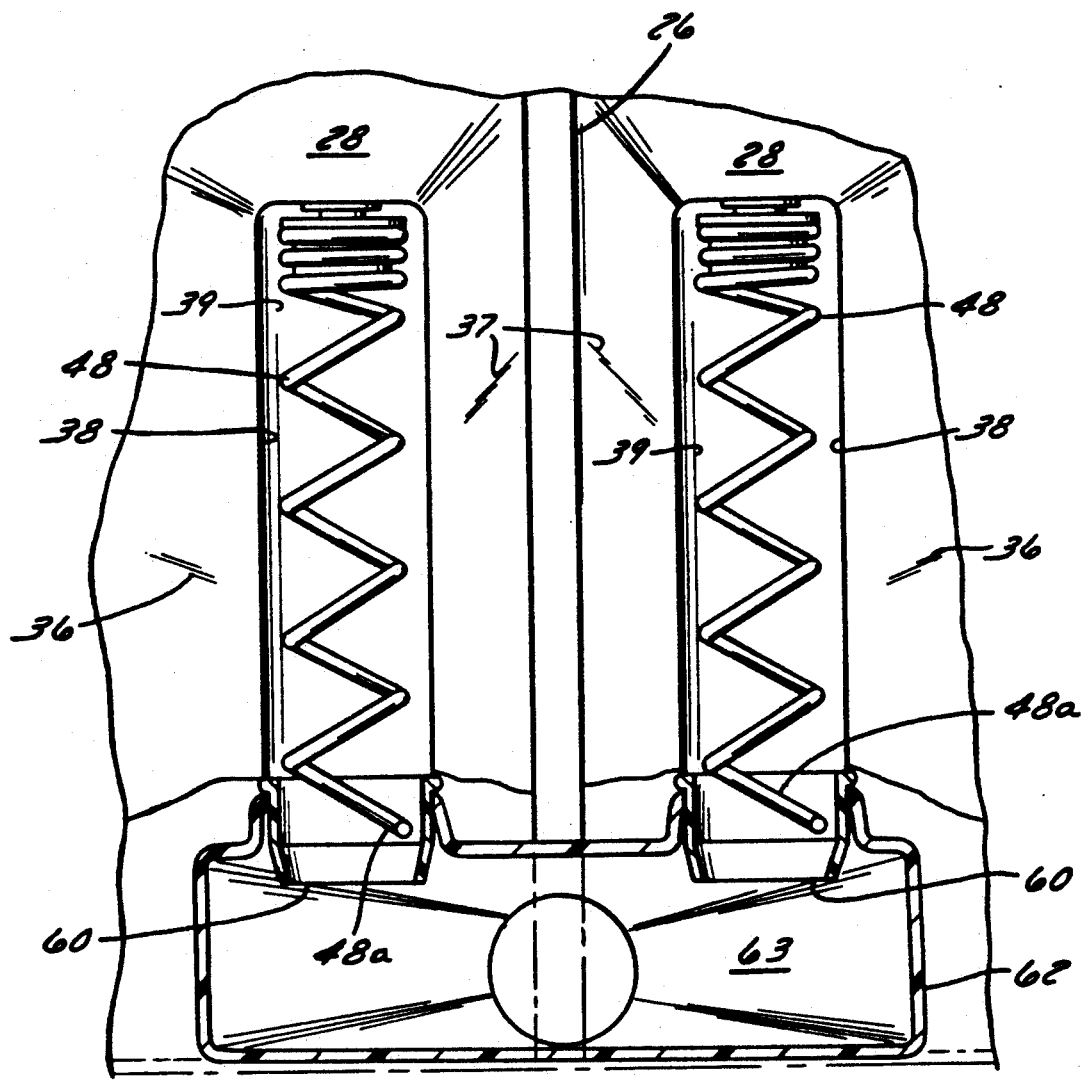
FIG. 4 is an enlarged sectional view taken along lines 4—4 of FIG. 3 showing the orientation of the auger elements with respect to the funnel communicating with the grinder.

Referring now to FIGS. 4, 7 and 7A, it may be seen that an auger element 48 is mounted for rotary movement within housing 38. One end of element 48 is releasable coupled to the end of a drive shaft 50 which rotates within bearing 52 mounted in end wall 54 of housing 38. Auger motor 56 is located in an enclosed compartment 58 (see FIG. 5) which is part of housing 13. Since the auger elements 38 are not operated simultaneously, a single motor 56 can be used to selectively drive each drive shaft 50 through any well known system of gears and pinions. Preferably, however, each auger element 48 is driven by a separate motor 56.

The top sectional view of FIG. 4 illustrates that the free distal end 48a of each auger element 48 terminates in a bean transition zone extending about the final one half pitch of auger element 48 and terminating at opening 60. Each opening 60 communicates with downwardly extending spout member 62 defining a chamber 63 common to all auger elements 48. The specific configuration of each transition zone and its relationship with auger element 48 and agitator wheels 40 are set forth in detail in commonly assigned and co-pending Application Ser. No. 07/816,749. While it is preferred to use the structure in such co-pending application, it is not essential for an understanding of the present invention to replicate the discussion in such application, and it is incorporated by way of reference herein. It is sufficient for the purposes of this application to state that teeth 40a of the agitator wheels 40 mesh with the helical turns of the auger elements 48 which causes the agitator wheel to turn when the drive shaft 50 is being driven. The beans are caused to smoothly flow into the auger element 48 through the transition zone and then into spout member 62.

Referring again to the exploded perspective of FIG. 5, it may be seen that the auger motor compartment 58 is located toward the rear of support housing 13 providing a space above and to the front to receive the lower section 30 of housing 12 including the auger housing 38 and spout member 62. The upper perimeters of front wall 64, side walls 66 and back wall 68 of housing 13 are collectively configured to compliment the sloping lower perimeter of housing 12, providing a seat upon which housing 12 can be positioned. Front wall 64 has an integral flange member 64a that serves as a top to an upper section of tank housing 14, shown generally as character numeral 93, and mounts upper warmer plate 65.

Figure 9:
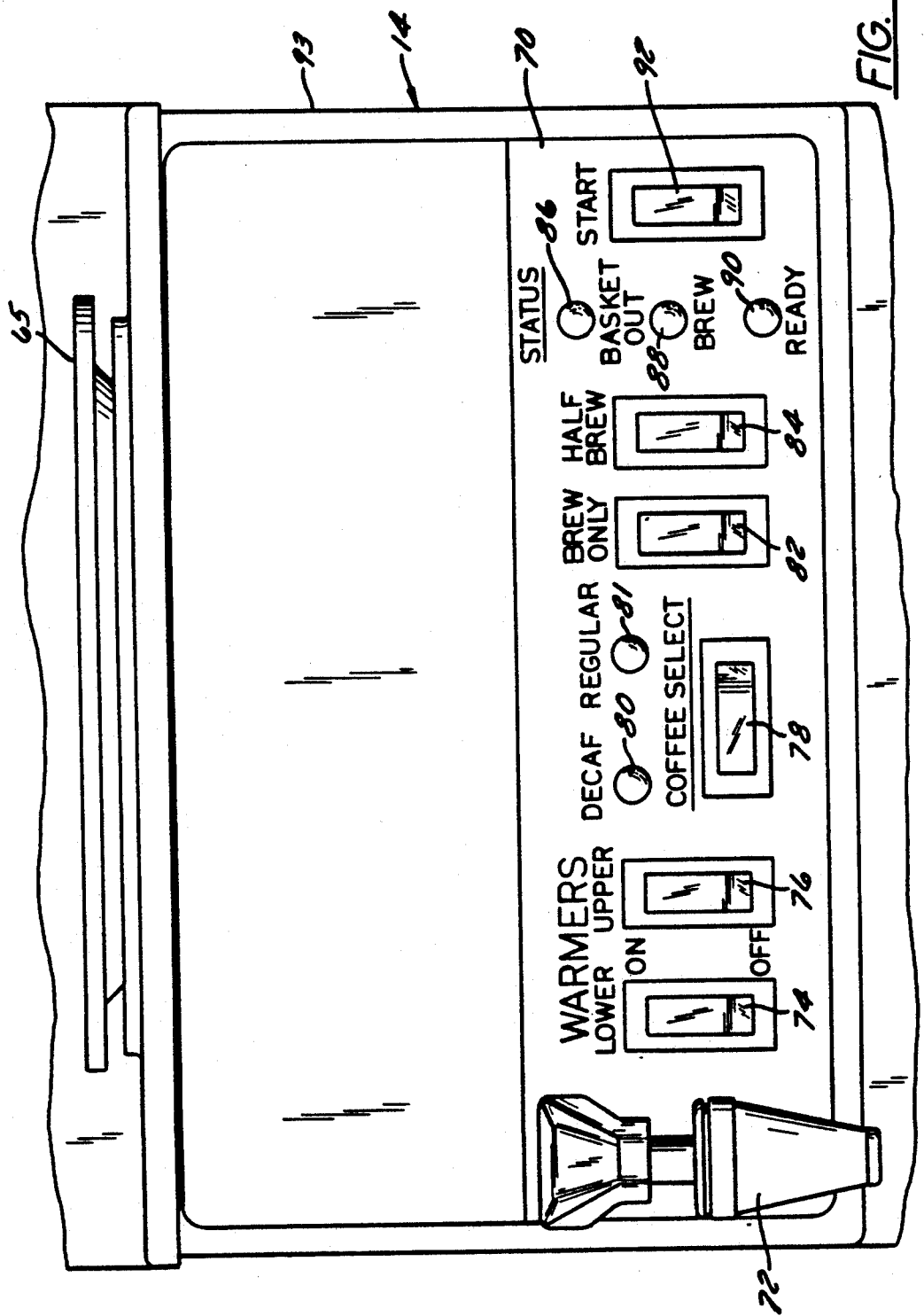
FIG. 9 is a view of the apparatus control panel positioned on the front surface of the upper section of the hot water tank housing.

As seen in the perspective of FIGS. 1 and 5, an operating panel 70 serves as the lower half of front wall to upper section 93 of housing 14 and includes the various operating controls for apparatus 10. The enlarged front view of operating panel 70 in FIG. 9 shows that the controls include, from left to right, a hot water tap 72 for providing hot water upon demand, control switches 74 and 76 for the lower and upper coffee decanter warming plates, selector switch 78 for selecting the type of coffee to be brewed, decaffeinated indicating light 80 and regular indicating light 81, selector switches 82 and 84 for selecting the amount of coffee to be brewed, indicator lights 86, 88 and 90, for, respectively, basket status, brewing status, and ready status, and start switch 92. The relationship of the various switches and lights are discussed below in conjunction with the control circuitry used in the operating sequences.

Figure 6:
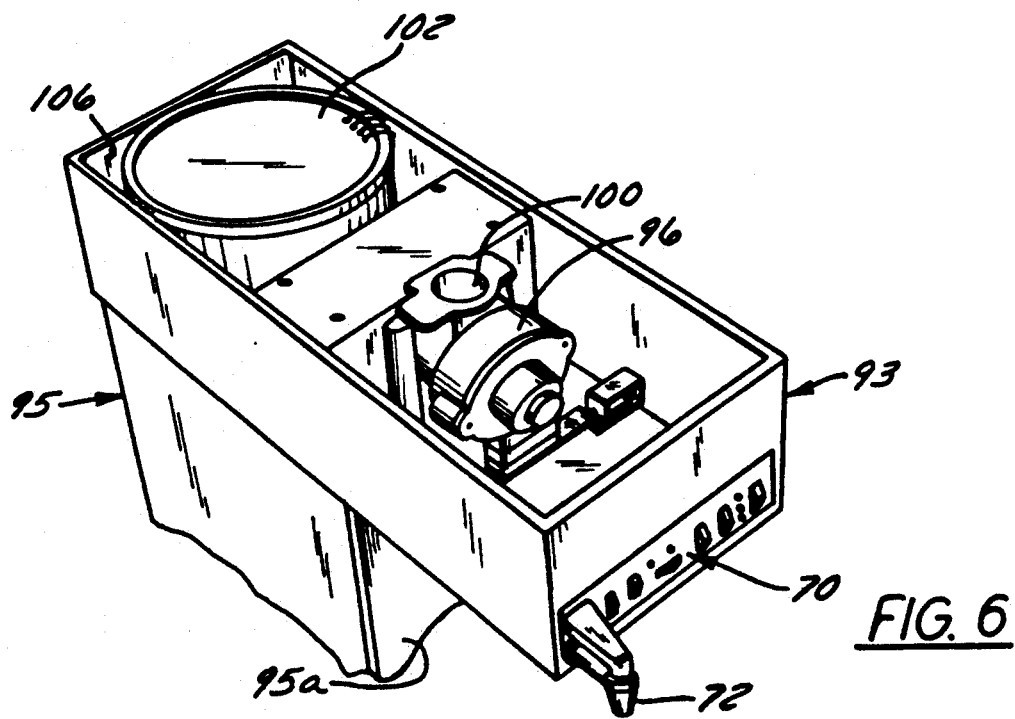
FIG. 6 is a perspective view of the apparatus of FIG. 1 in which the hopper and auger motor housing have been removed and the view is looking down upon the upper section of the hot water tank housing.
Figure 3:
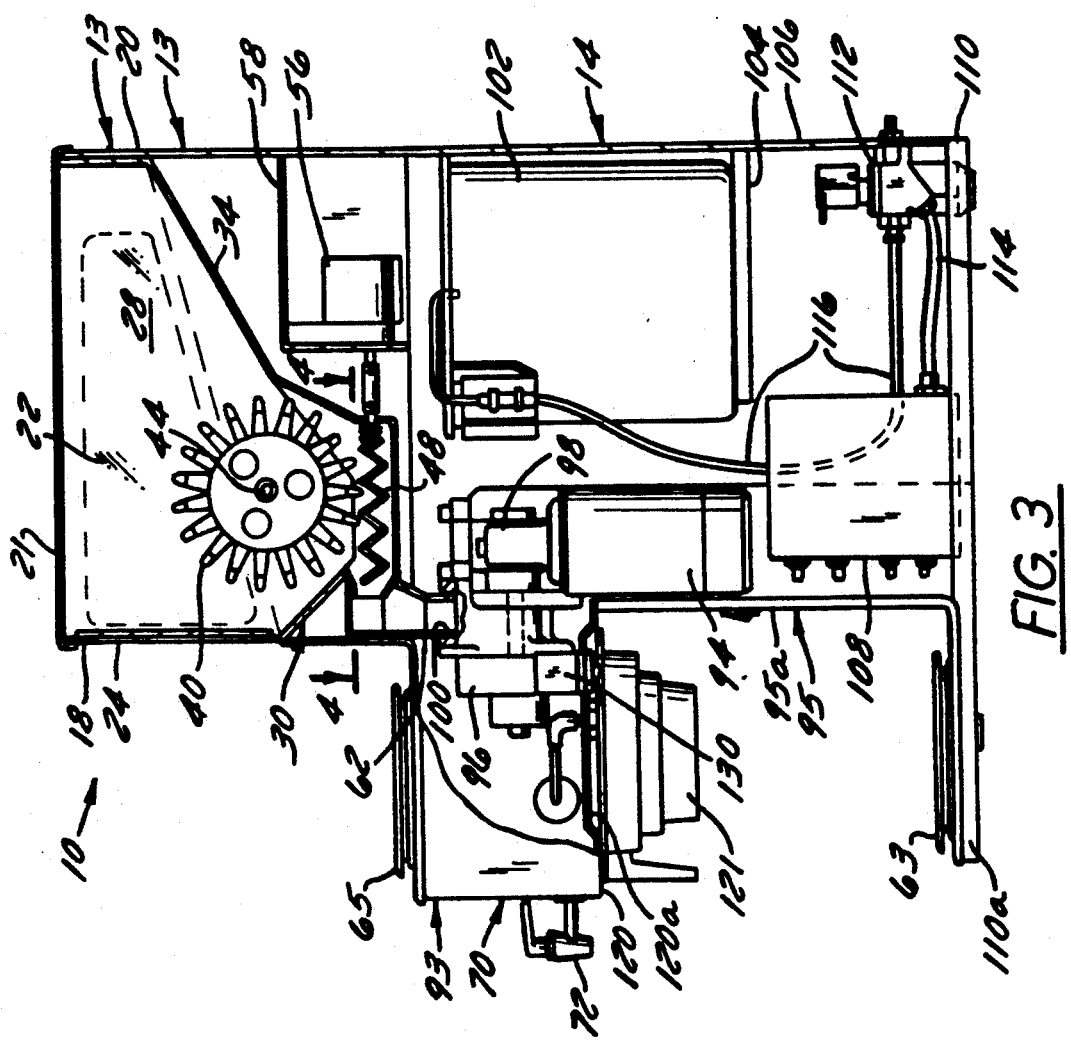
FIG. 3 is a side section view of the apparatus of FIG. 1.

The side sectional view of FIG. 3 and the perspective of FIG. 6 provide the best pictorial description for the following discussion. Tank housing 14, that serves as the housing for various major components of apparatus 10, is comprised of two sections. A first or upper section noted by character numeral 93 extends out over lower section 95. Grinder motor 94 is mounted vertically within lower section 95 adjacent front wall 95a and is connected to grinder 96 positioned within upper section 93 by a right angle drive 98. An opening 100 into grinder 96 communicates directly with spout member 62. Hot water tank 102 is positioned behind grinder motor 94 on platform flange 104 that is mounted to back wall 106. Timer control box 108 is secured directly to the bottom wall 110 within the front part of section 95 while water valve 112 is secured to the back part of wall 110. Line 114 from valve 112 leads to a remote source while line 116 leads to tank 102. A front extension 110a of lower wall 110 supports lower warmer plate 63.

The use of the grinder motor 94 with a right angle drive 98 in a combination coffee grinder and brewer provides major structural advantages, not the least of which is permitting a more compact assembly of components. Other advantages include locating motor 94 in a cooler location within the assembly and providing a lower center of gravity for the entire apparatus. The typical positioning of a grinder with straight line motors often results in the motor to be positioned above the hot water tank. As temperatures in the hot water tank often approach the boiling point of water, the operational life of a motor may be significantly reduced. Use of the right angle drive motor also facilitates maintenance since the hot water tank is not covered by the motor.

Figure 2:
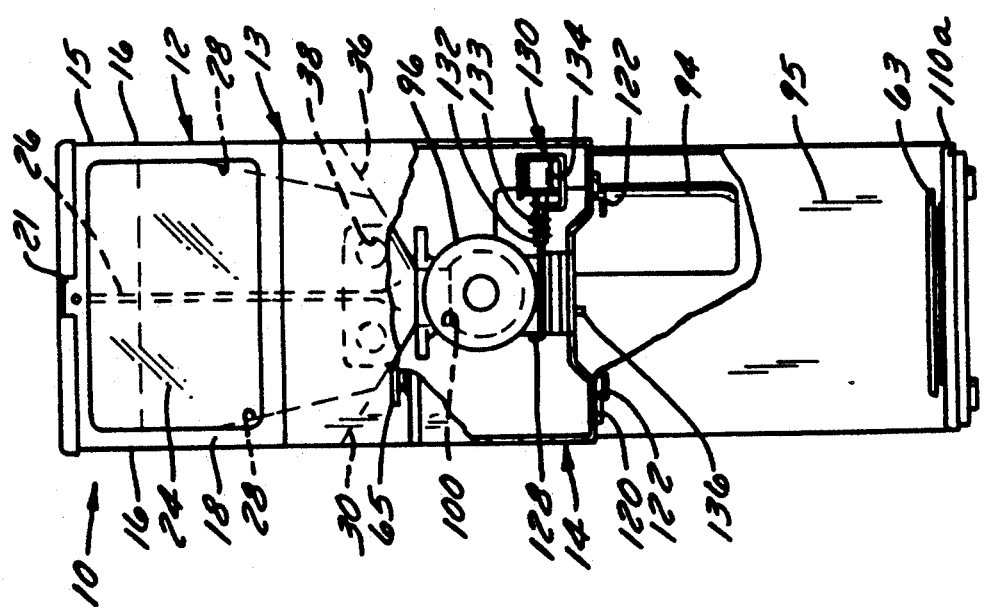
FIG. 2 is a front view of the apparatus of FIG. 1, partially broken away, to show the auger, grinder, right angle transmission drive, grinder motor, and wetness prevention valve assembly.
Figure 8:
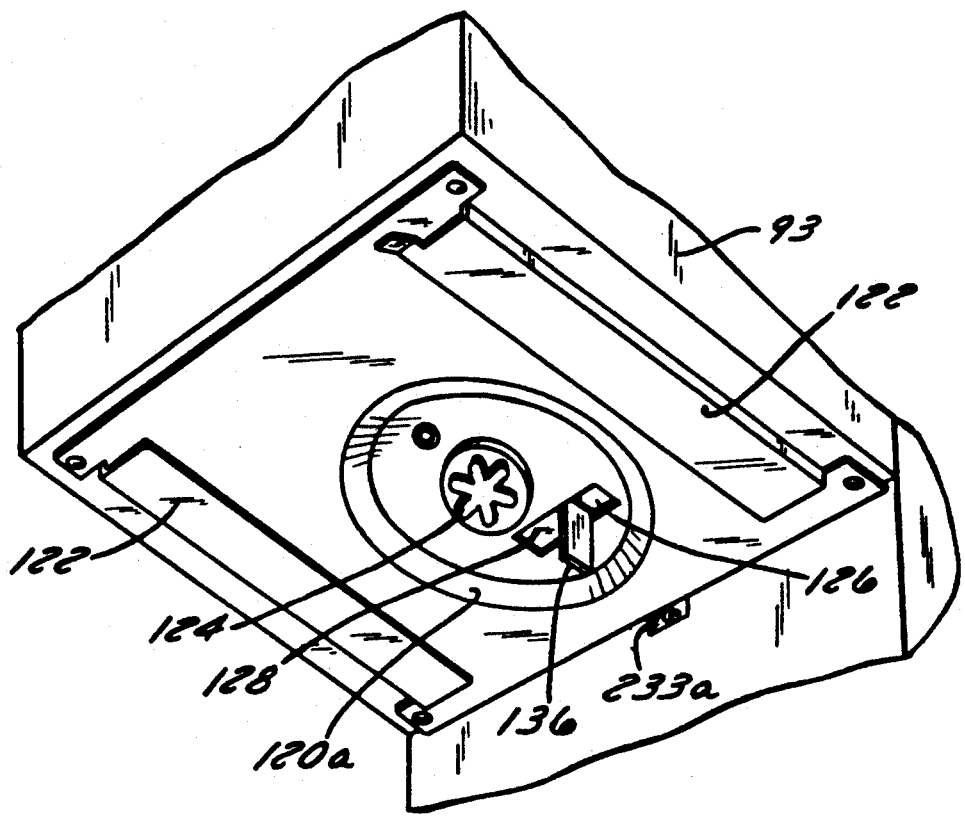
FIGS. 8 and 8A, respectively, are perspective view of the underneath portion of the brew basket support surface of the upper section of the hot water tank housing of FIG. 6 showing the brew basket support arms and the ground coffee and hot water delivery openings and an enlarged side view of a portion FIG. 8 showing the basket arm switch.

Mounted to the lower surface 120 of upper section 93 are a pair of brew basket arms 122 best seen in the perspective of FIG. 8. A circular recessed portion 120a contains the hot water distribution openings 124 and an opening 126 through which coffee grounds are ejected from grinder 96. For simplicity in description the region about openings 124 and 126 are called the coffee ground and/or hot water delivery region. A slide valve 128 is positioned across opening 126 and forms part of a slide valve assembly 130 best seen in FIG. 2. While the specifics of the slide valve assembly do not form a part of this invention, it is described in detail in co-pending, commonly assigned and contemporaneously filed application Ser. No. 07/951,449, Attorneys Docket number 0001/171 and is incorporated by way of reference herein. It is, however, sufficient for the purposes of the description herein to note that slide assembly 130 comprises a slide valve 128 directly connected to a solenoid plunger 132 of solenoid 134. Slide valve is normally biased shut by spring 133 to prevent any moisture or other foreign substances from entering into the grinder. When the grinder is actuated, solenoid 134 is energized causing slide valve 128 to open the opening 126, allowing coffee grounds to pass through. A finger tab 136 (FIG. 8) extending from slide valve serves two different functions. It acts as a coffee ground distributor by deflecting grounds when ejected through opening 126 by grinder 96. Finger tab 136 further allows the manual opening of slide 126 to facilitate maintenance and cleaning.

Many coffee brewers and grinders are deliberately placed in full view of customers in commercial eating establishments to increase awareness that the coffee being made is fresh. In some instances, the coffee beans are housed in transparent containers or containers with windows sealed from the atmosphere that are readily viewable. Beans are transferred from the housing manually to a grinder when fresh brewed coffee is desired. In combination grinder-brewers, it is desirable that the beans be viewed while residing in a hopper feeding the grinder. When the level of the beans drops significantly, it is difficult to see the beans, particularly at a distance, even though a considerable volume of the beans still remains.

The structure of hopper housing 12 as best shown in FIG. 7 greatly minimizes the problem of viewing beans when at low levels in hopper 12. It can be seen that the level of coffee beans 138 slopes upward from right to left. The piling of coffee bean is particularly pronounced in a region 140 (shown by brackets and dashed lines) located between wheel 40 and front wall 18 of upper section 15. Since the greatest depth of the trapezoidally-shaped side window 24 is toward front wall 18, the beans 138 are clearly visible from any front or side view of the apparatus. Furthermore, it has been determined that front piling of the beans 138 above the lower edge of side windows 22 occurs even at extremely low quantities of coffee beans in hopper housing 12.

While it is clear from FIG. 7 that the shape of window 24 facilitates the viewing of coffee beans, it is the combination of the shape of side windows 22 with other components that makes possible the view of the coffee beans even at low levels. Auger wheel 40 is positioned such that the center of rotation 144 is as low as possible within hopper housing 12. Both wheel 40 and lower section 30 are also positioned forward in relationship with upper section 15. Wheel 40 is rotated clockwise by auger element 48, causing movement of beans 138 into region 140. Sloping front wall 32 of lower section 30 is in close proximity to radially extending teeth 41 of wheel 40 facilitating the movement of the beans into region 140. The frictional characteristics of the beans are such that the beans once tumbled into region 140 tend to remain piled until removed by further portioning action of auger element 48. It has been noted that visible piling of beans in region 140 occurs even when the average surface level of the beans is significantly below the plane of the center of rotation of wheel 40.

The circumference of agitator wheels 40 is largely a function of the size of the hopper itself. However, it has been determined that the distance of the periphery of wheels 40 from the lower section front wall 32 is an important consideration. If the distance is too great, then the effect of the rotation of wheels 40 in piling beans 138 in region 140 becomes increasingly less significant. In most situations, it is desirable to maintain this distance within about 3 to 5 times the width of an average coffee bean or about 24 to 40 millimeters.

Figure 11:
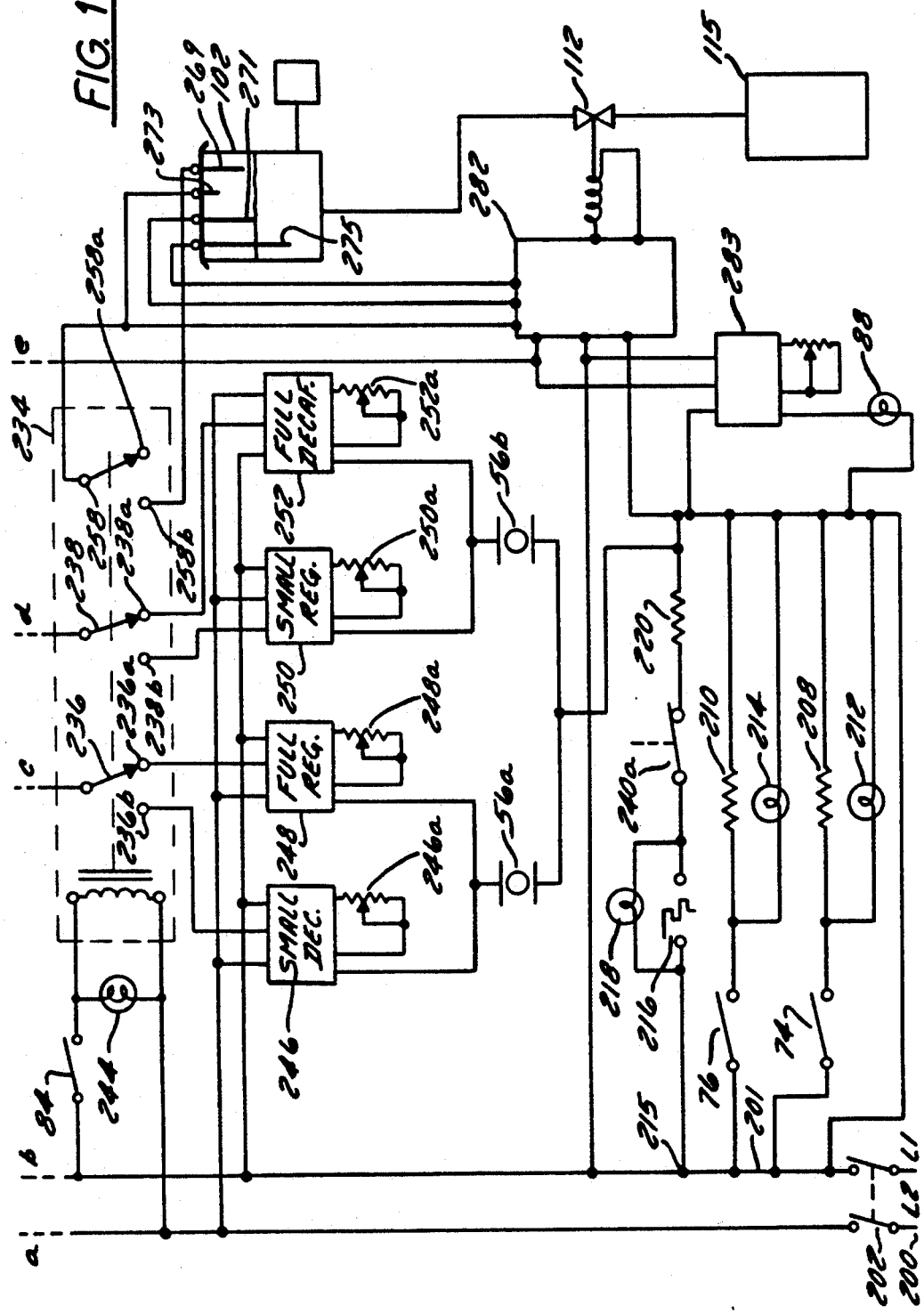
FIGS. 11 and 11A collectively represent an electrical schematic of the control circuitry of the present invention.
Figure 11A:
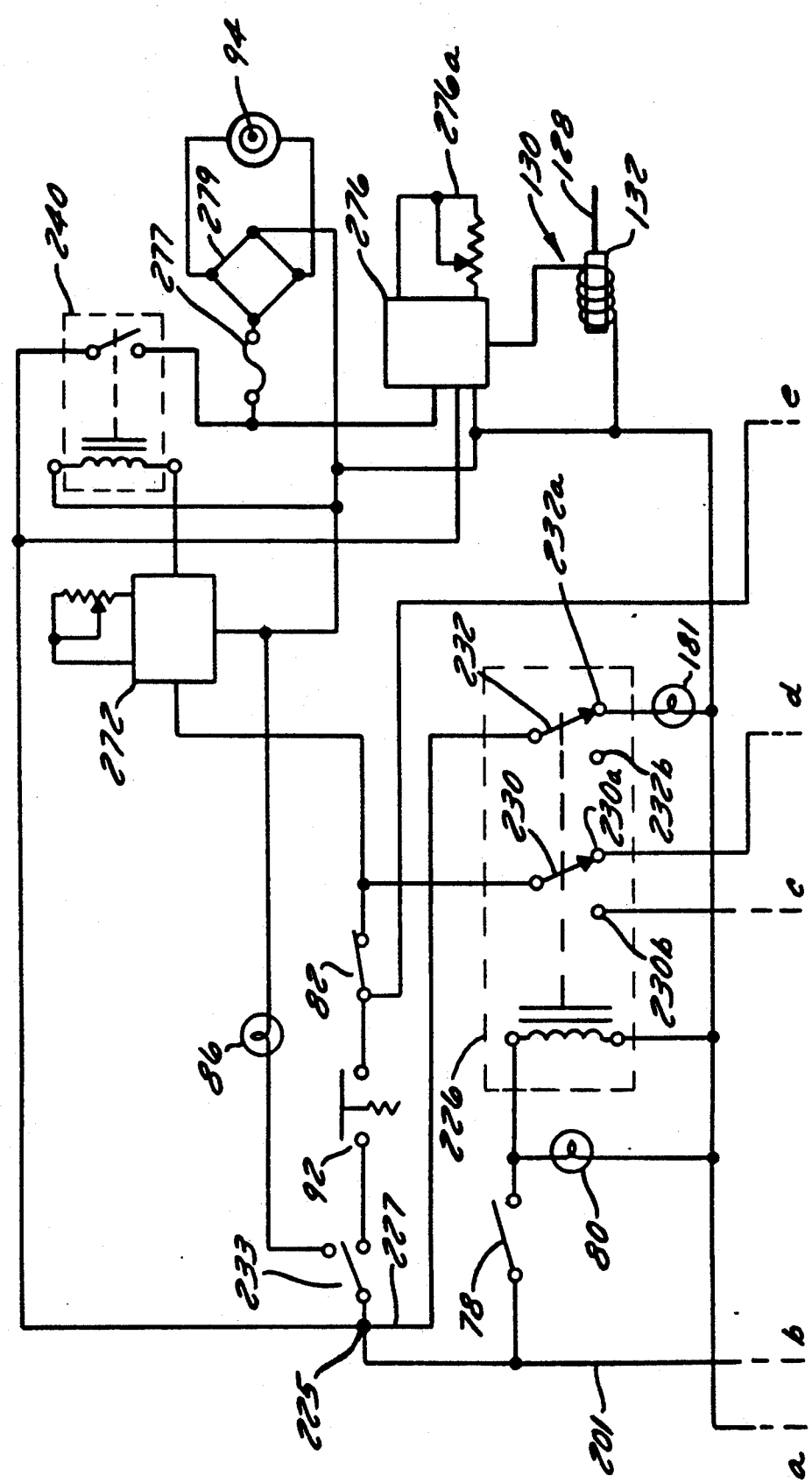

Reference is now made to FIGS. 11 and 11A depicting an electrical schematic of a circuit used in the present invention. Due to the number of components in the circuit, a portion of the circuit is shown in FIG. 11 broken at lines a, b, c, d, and e connecting to the identical lines in FIG. 11A. The circuit is connected to a 120 volt AC source 200 across main power disconnect switch 202. Lines 201 connects switches 74 and 76, that lead, respectively, to plate warmer heating elements 208 and 210 and optional indicating lights 212 and 214. Line 201 is connected at point 215 to tank heating thermostat 216 having a predetermined set point near boiling temperatures, for example, at 200° F. Thermostat 216 opens upon increasing temperature. Connected in parallel with thermostat 216 is an optional water ready light 218. Light 218 is on only when thermostat 216 is off. For example, when hot water tank heating element 220 is conducting, i.e., thermostat 216 is closed, thus there is no voltage differential across ready light 218. Relay switch 240a is an element of relay 240, the function of which is discussed below.

Line 201 is further connected to coffee selection switch 78, decaffeinated coffee indicating light 80 and the coil side of DPDT relay 226 (see FIG. 11A). As can be seen, when switch 78 is open, decaffeinated coffee indicating light 80 is off. However, line 201 also is connected at contact point 225 to line 227 leading to arm 232 of DPDT 226. In the state shown for DPDT 226, a circuit is completed through regular coffee indicating light 81. In this state, arms 230 and 232 are, respectively, resting against contact points 230a and 232a. When switch 78 is moved to the decaffeinated coffee position, i.e., closed, the decaffeinated light 80 is switched on and the coil of DPDT relay 226 is energized, causing arms 230 and 232 to respectively switch to contact points 230b and 232b. Regular light 81 is extinguished when arm 232 rests against contact 232b.

Line 201 is additionally connected at contact point 225 to start switch 92 and normally closed switch 82 directly to control circuit 282, timer 283 and brewing light 88.

Figure 8A:
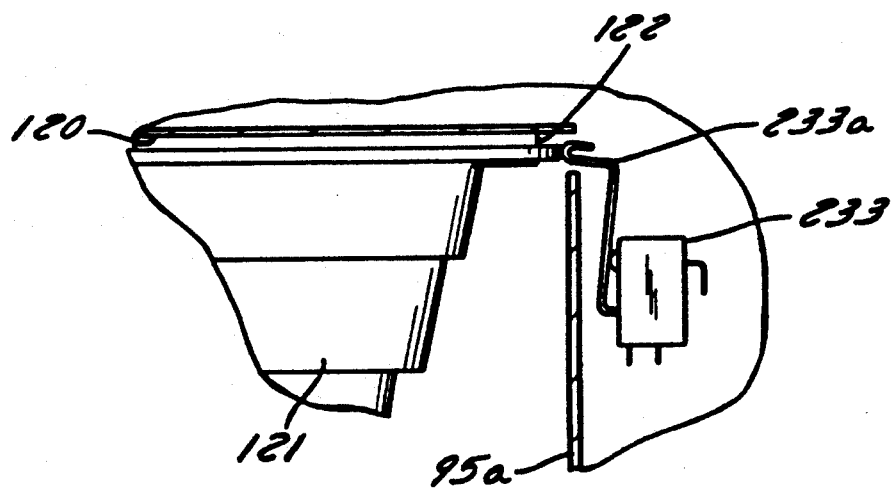

As a precaution to prevent activation of the system without a brew basket in place, the system may be provided with a basket status switch 233, a lever operated SPDT switch, normally biased open, is positioned behind wall 95a with lever contact arm 233a exposed (see FIG. 8A). When a brew basket is inserted and pushed along rails 122, the basket comes into contact with arm 233a, closing switch 233 and extinguishing lamp 86. When switch 233 is in the open position, basket out lamp 86 is lit. Because one shot timer 272 is out of the circuit, auger motors 56a and 56b, grinder 94 and brewer contact 282 are not activated.

Contact points 230b and 230a are respectively connected to a conventionally constructed triple pole double throw (TPDT) relay 234 via throw arms 236 and 238. Line 201 can additionally be connected through brew volume selection 84 switch to half brew indicating light 244 and the coil side of relay 234. When switch 84 is open, as shown, indicating light 244 is off and arms 236 and 238 rest against contact points 236a and 238a.

The use of DPDT relay 226 which leads to any TPDT relay 234 permits the selection of one of the four one-shot timers 246, 248, 250 or 252. Timers 246 and 248 are each connected to the auger motor 56a driving the auger element that transports beans from the decaffeinated coffee hopper to the grinder. Similarly, timers 250 and 252 are connected to auger motor 56b driving the auger element transporting beans from the regular bean hopper to the grinder. Timers 248 and 252 are operational over longer time intervals than timers 246 and 250, thus permitting the transportation of a larger volume of beans to the grinder. Each of the timers 246, 248, 250 and 252 can be time adjusted by respective adjustable potentiometer 246a, 248a, 250a and 252a.

The various adjustable potentiometer 246a-252a for adjusting one shot timers 246-252 are positioned on front panel 108a of control box 108. This panel is seen in FIGS. 10 and 10A. Access to control panel is behind front wall 95 of housing 14 to restrict any careless setting of the timers.

Once switch 84 is closed, energizing the coil of relay 234, arms 236 and 238, respectively, are connected to contacts 236b and 238b. Timers 246 and 250 are therefore potentially placed in the circuit capable of being energized depending upon the state of switch 78. Timer 246 represents a half brew of decaffeinated coffee while timer 250 represents a half brew of regular coffee. If, for example, switch 78 is open as shown, then only timer 250 is operative, causing auger motor 56b driving its auger element carrying regular coffee beans to operate for a period of time determined by its time adjustment. In this instance, since a half brew was also selected, the time adjustment of timer 250 is made compatible with the throw of beans sufficient for consistent brewing coffee of the proper strength.

Figure 12:
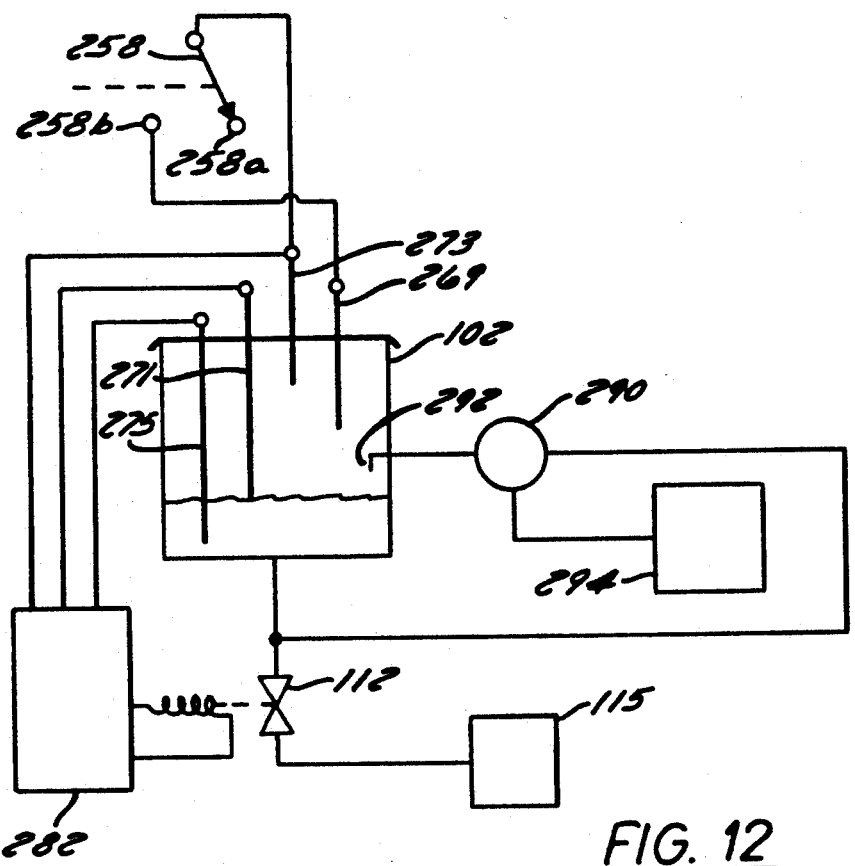
FIG. 12 is an enlarged schematic of the hot water delivery control circuitry of FIG. 11.

While there are various ways in which multiple predetermined volumes of hot water may be delivered in a brewer, one example is described in detail in co-pending and commonly assigned U.S. Pat. Application Ser. No. 07/864,525 filed Apr. 7, 1992 in which a plurality of sensing water level probes are used to define the precise volume selected. A detailed discussion of how such a system operates is set forth in the referenced co-pending application. However, since the present invention is not based upon the details of the invention therein, it is incorporated by way of reference herein. As seen in FIG. 12 (an enlarged view of the relevant portion of FIG. 11), a water proportioning system of the type described in Co-pending Application Ser. No. 07/864,525 is shown. Water tank 102 is provided with a plurality of conducting probes 269, 271, 273 and 275. Probe 273 is a high water detecting probe which, as illustrated, is always in the circuit. When probe 273 senses water, a signal is sent to batch control circuit 282 which causes solenoid valve 112 to close water supply line 114 from water source 115. Probe 273 thus serves in one capacity as a safety feature to ensure against overflow in tank 102. Probe 275 serves to complete a circuit within the liquid.

TPDT relay 234 has a third arm 258 which is associated with the selection of a predetermined large or small volume of hot water complimentary to the selected large or small quantity of beans to be ground. Arm 258 of relay 234 is depicted as resting against contact 258a which is not directly connected to any probe. Triggering by control circuit 282, however, will cause the water level in tank 102 to rise from its position at low probe 271 (which is positioned slightly below the level of siphon 292) until it contacts high probe 273. At that position, solenoid valve 112 is closed and dump valve 290 opens to allow water to enter siphon 292 to be dispensed to the brew basket assembly as indicated by block 294. The water level falls until the suction at siphon 292 is broken. When arm 258 rests against contact 258b, the intermediate probe 269 is placed in the circuit. Triggering of control 282 then causes the water level to rise until probe 269 is contacted. At that point, the water is siphoned out of tank 102 until the suction at siphon 292 is broken.

Figure 13:
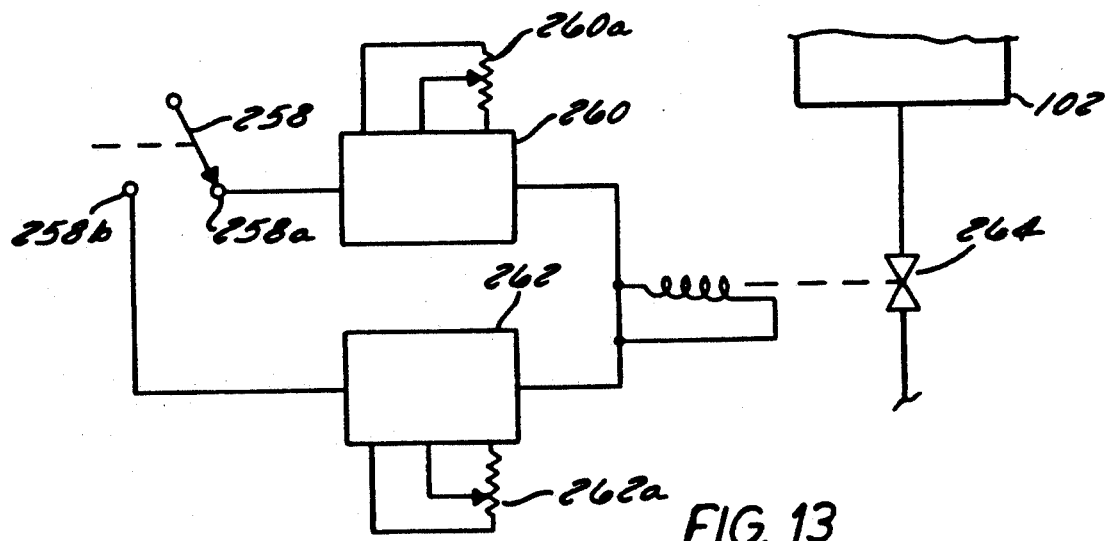
FIG. 13 is a schematic of an alternate hot water control circuitry that may be used with the present invention.

An alternate water delivery system may be employed, however. For example, a timer controlled hot water source may be used. In the alternate system of FIG. 13, the third arm 258 of TPDT relay is wired to select a particular timer to provide the requisite amount of hot water. Arm 258 rests against contact 258a when switch 84 is open. Contact 258a is connected to timer 260 which leads to solenoid valve 264 Timer 260 is preset to maintain valve 264 open for a time sufficient to allow the larger hot water volume to be distributed from tank 102 to the brew basket. When arm 258 rests against contact 258b, a smaller predetermined volume of hot water is distributed as controlled by timer 262. Both timers 260 and 262 maybe provided with potentiometer 260a and 262a, respectively, to vary the timing period.

When start switch 92 in line 201 is depressed, it connects line 201 momentarily to a one-shot grinder motor timer 272 and through timer 272 to relay 240, grinder motor circuit 274, and delay timer 276. Circuit 274 comprises a circuit breaker 277, a full wave rectifier 279, and grinder motor 94, a d.c. permanent magnet type wired in series.

Solenoid operating slide valve assembly 130 is connected to an adjustable delay timer 276 which is triggered by grinder timer 272 and can be programmed to move solenoid plunger 132 to close slide valve 128 after a predetermined interval following then completion of grinding. The brewing cycle itself is timed such that hot water does not spray over the grounds in the brewing basket until valve 128 closes to prevent moisture from seeping into the grinder.

Initially, the equipment is placed in a ready-to-operate state by closing main power switch 202. The thermostat 216 is normally closed such that heating element 220 begins to heat the water in tank 102. Since thermostat 216 is closed, hot water ready light 218 is off. It should be noted that heating elements 208 and 210, respectively associated with lower and upper warmer plates 63 and 65, may be on or off without affecting operation of the equipment. Optionally, heating elements 208 and switch 74 may be wired to control the brewer circuits such that the brewing cycle can be initiated only when lower warmer plate 63 is being heated.

The table set forth below provides the generic/trade name for many of the components of the control circuitry. Other components not mentioned in the table are standard off-the-shelf items that are readily available.

| TABLE OF COMPONENTS | | |
|---|---|---|
| Component | Name | Where Obtainable |
| Heating element 210 | TC31-20 1200W/120V/SL24 | Hot Watt, Inc Danvers, MA |
| Thermostat 216 | D1/D 18-1 | Hot Watt, Inc Danvers, MA |
| DPDT 226 | Type KUIP-14A15 | Potter & Brumfield Princeton, IN |
| TPDT 234 | Type KUIP-11D55 | Potter & Brumfield Princeton, IN |
| Relay 240 DPDT | Type KUIP-14A15 | Potter & Brumfield Princeton, IN |
| Timers 246, 248, 250, 252 | Model Q2F-00010-321 | National Controls West Chicago, IL |
| Timer 272 | Model Q2F-00060-321 | National Controls West Chicago, IL |
| Timer 276 | Model Q3F-00010-321 | National Controls West Chicago, IL |
| Circuit Breaker 277 | Model W23X1A1G-10 | Potter & Brumfield Princeton, IN |
| Rectifier 279 | Inter. Rectifier Type 250JB2L | Newark Electronics Chicago, IL |
| Right Angle Trans. Drive 98 | Right angle gear motor Type 1L500 | W.W. Grainger, Inc. Chicago, IL |

To illustrate a sequence of operation, reference is made to FIG. 9 in conjunction with the circuit of FIGS. 11 and 11A. The former depicts the front operating panel 70 of grinder brewer combination of the present invention. For purposes of this example, it is assumed that the main power switch 202 has been turned on and hot water is now available as indicated by ready light 90 on panel 70. Regular coffee is desired and the operator moves switch 78 to the right, thus opening switch 78, and turning on regular light 81. Similarly, because a full brew is desired so the switch 84 is moved to the lower position, thus in effect opening switch 84. Additionally, the lower warm plate 63 has been energized by moving switch 74 to the "on" position, thus closing switch 74 and turning on heating element 208 and optional indicating light 212. To start the grinding and brewing cycle, start switch 92, normally biased to an open position, is pushed, momentarily establishing a closed circuit to timer 272. Timer 272 and batch control 282 are energized 25 as is timer 252. Auger motor 56b and grinder motor 94 are energized. A typical cycle for portioning a quantity of beans for a large brew is for the auger motor to be energized for about 7 seconds. The grinder motor continues for another 10 seconds and the valve solenoid arm 132 positions slide valve 128 to close the passageway from the grinder to the brewing basket about 3 seconds after the grinding operation ceases. The normal delay in the brewing cycle is timed such that hot water begins to spray over the grounds in about 40 seconds after initiation. With a half brew the timing is such that hot water is distributed in about 20 seconds.

It is also important to note that relay 240 is energized which opens switch element 240a as long as the grinder timer 272 is operational. This mean that the hot water tank heating element 220 is not energized as long as grinder motor 94 is operational. The advantage of this electrical design becomes readily apparent when it is necessary to operate with combined power consumption of the hot water heating element and grinder motor which, if operated simultaneously, would ordinarily exceed permissible electrical power upper limits. This is often the case when the grinder-brewer is operated using a 120 V AC electrical power source. It is often very desirable to have an apparatus which can use larger heating elements and/or grinder motors without exceeding such limits. The heating element is normally off at this time, as the ready light would normally be "off" when the cycle is shorted. The relay requires that the heater may not be on when the grinder is engaged.

As auger motor 56b drives auger element 48 leading from the hopper containing regular coffee beans and moves the beans into the grinder 96 in a quantity needed for a large brew. The grinder grinds the beans into grounds and ejects the grounds that are dispensed through valve assembly 130 into coffee delivery region above a fresh filter positioned in brew basket 121. When auger timer 248 times out, auger motor 56b is turned off and relay 240 closes switch 240a causing tank heating element 220 to be placed back into the circuit depending upon the state of thermostat 216. Grinder motor 94 continues for a few seconds longer, ensuring all of the coffee within the grinder is completely ground and transported to the basket assembly. When grinder motor 94 ceases to operate, the slide solenoid valve assembly 130 continues to remain open several seconds longer, the delay being to ensure assembly 130 itself does not become contaminated from residual grounds falling from the grinder. Closing of the valve assembly 130 precludes the moisture arising out of the brewing operation from seeping back into the grinder 96.

When the one-shot timer 272 sends a signal to batch controller 282, solenoid valve 288 is caused to open allowing water from source 288 to flow into the bottom of tank 102 containing hot water. The hot water (above the cooler new water introduced at the bottom of tank 102) is pushed up until the surface thereof touches water sensor 273. Valve 288 then is closed and dump valve 290 is opened, allowing hot water to flow under pressure differential through siphon head 292 to the brewing assembly 294. This continues until the water level drops below the level of siphon 292, thus breaking the suction. The volume of water which flows into the brewing assembly 294 is the larger of the two different amounts permitted by the batch system since sensor 273 is the higher of the sensors. This amount is compatible with the large proportioned amount of beans that were ground during this sequence.

Still another attractive feature of the present invention is its ability to handle special coffees that, due to the nature of the coffee, would gum the interior parts of the apparatus such as the auger elements and grinders if the coffee was handled in the usual manner. Such coffees are generally placed manually in a brew basket. The present invention allows this by bypassing the circuitry involving the auger motors and grinder motor when start button 92 is depressed. This is accomplished through the opening of switch 82 which disconnects one shot timer 272, thus motor 94, and the auger motors 56a and 56b from the circuit. The brewer batch control 282, however, is unaffected. Thus, hot water is delivered to the brewer basket either in a full or half batch depending upon the disposition of switch 84.

Figure 14:
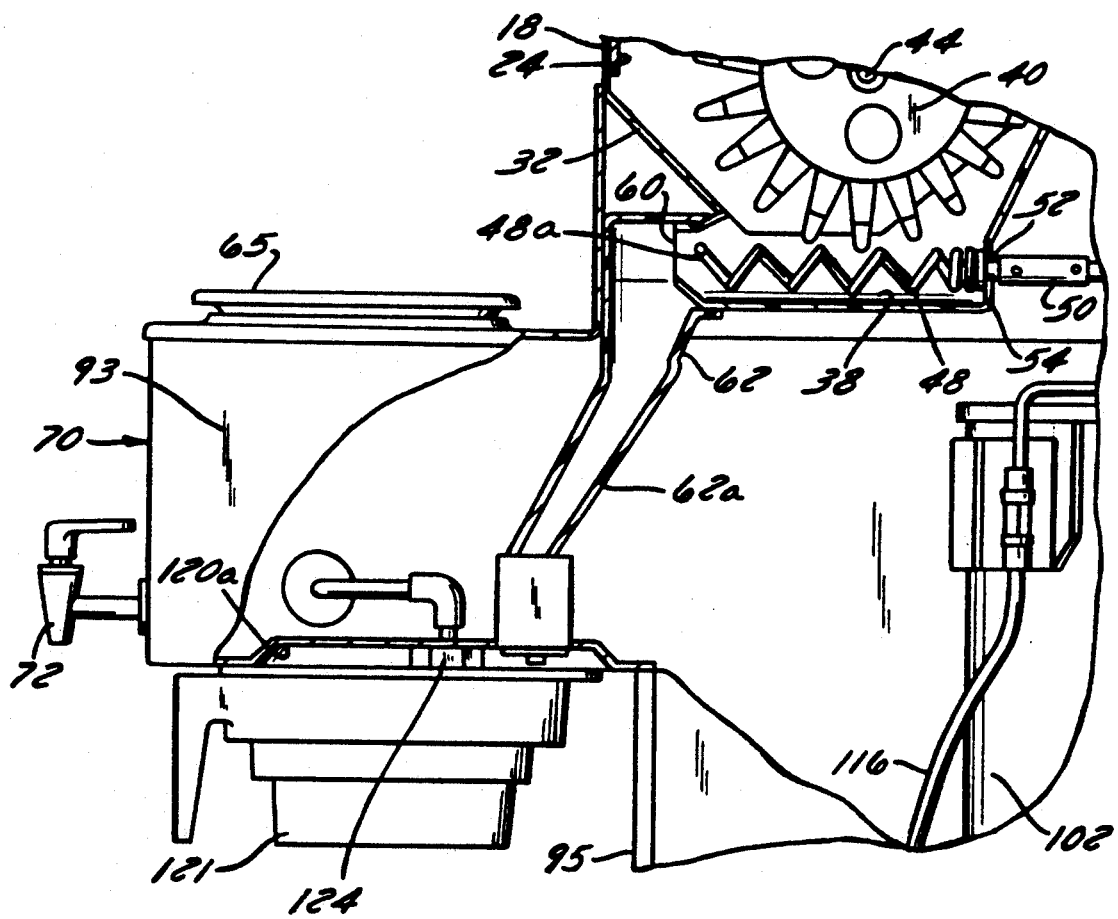
FIG. 14 is a partial side section view of the apparatus of FIG. 1 with the grinder assembly removed but with an extension to the spout member leading to the brew basket.

One of the major advantages of the coffee and dispensing and brewing system of the present invention is the ease in which the apparatus can be converted from a coffee grinder system to one that moves ground coffee directly from the hoppers storing the ground coffee to the brew basket. As shown in FIG. 14, a dispensing apparatus essentially the same as that shown in FIG. 3, except with the grinder motor removed, has an extension 62a leading directly from spout member 62 to the brew basket region. Thus, the auger elements 48 transport a predetermined amount of ground coffee directly from a selected hopper spout assembly to the brew basket while the hot water making system distributes water in a predetermined volume corresponding to the predetermined amount of coffee delivered. The various timer controls would necessarily be adjusted to compensate for the absence of a grinder. For example, valve assembly 130 would be timed to close a very short time duration after auger 48 ceased carrying ground coffee to spout 62, allowing only for the short duration of time taken by the coffee to fall through spout member 62.

While the invention has been described in detail with respect to the preferred embodiment, it is not intended that the scope of the invention be limited other than set forth in the following appended claims. For example, the timing components of the electrical circuit of FIGS. 11 and 11A could be accomplished by an appropriately programmed microprocessor.

I claim:

1. A coffee dispensing and brewing apparatus comprising
   (a) coffee dispensing means for dispensing a predetermined amount of coffee to a brew basket, said coffee dispensing means including
      (i) a hopper for holding a supply of coffee beans,
      (ii) means communicating with said hopper for portioning coffee beans in a predetermined amount, and
      (iii) a grinder for receiving and grinding said predetermined amount into ground coffee;
   (b) a brew basket holding means for releasably holding said brew basket in a region adjacent a passageway to said grinder whereby said brew basket receives said predetermined amount of coffee in ground coffee form;
   (c) hot water making and delivery means for distributing a predetermined volume of hot water to said region during a brewing cycle, said hot water means including a tank for holding said hot water before distribution thereof; and
   (d) a grinder motor and right angle power transmission means for coupling said motor to said grinder, said motor being located below said grinder and adjacent a vertical side of said tank.

2. The apparatus of claim 1 in which said portioning means is an auger element coupled to an auger motor.

3. The apparatus of claim 2 including a valve means for closing said passageway during said brewing cycle thereby preventing water vapor generated from moving into said coffee dispensing means when hot water is being distributed to said brew basket.

4. The apparatus of claim 3 including slide valve control means, said valve means being a slide valve connected to a solenoid, said solenoid responsive to said control means and operative to close communication between said brew basket and said dispensing means before said brewing cycle commences.

5. The apparatus of claim 4 in which said slide valve is connected to a plunger of said solenoid and moves in the same plane of said solenoid plunger.

6. The apparatus of claim 1 in which said coffee dispensing means includes an upper section defining a plurality of hoppers each for holding a supply of coffee beans and a plurality of auger elements associated with said hoppers.

7. The apparatus of claim 6 in which said dispensing means has a lower section integral with said upper section, said lower section defining a plurality of chambers each housing an associated one of said auger elements and a plurality of funnel portions for guiding said predetermined amount of beans from said associated hopper to said associated auger element chamber.

8. The apparatus of claim 7 wherein said dispensing means further includes means for guiding said beans received from said auger elements directly to said grinder.

9. The apparatus of claim 8 in which said guiding means is a bean transition chamber feeding an enclosed spout chamber directly connected to said grinder.

10. The apparatus of claim 6 in which said upper section has side walls having a trapezoidal shape, each of said hoppers having an agitator wheel mounted for rotational movement therein and meshing with an associated one of said auger elements and being moved thereby when said associated auger is actuated, said agitator wheels rotating in a plane essentially co-planar to said upper section side windows and having a periphery extending closer to said upper section front wall than said upper section back wall and above the lower front edges of said upper section side windows near said front wall.

11. The apparatus of claim 6 in which said upper section is defined by front, back and side walls and a dividing wall dividing said upper section into two compartments each for housing coffee and a lower section housing said auger elements and defining a plurality of funnel portions to guide said coffee from said hoppers to said auger elements, said dispensing means further including a lower section defining a plurality of funnel portions each associated with one of said hoppers, each of said funnel portions for guiding coffee from an associated one of said hoppers to an associated one of said auger elements.

12. The apparatus of claim 11 including an agitator wheel mounted in each of said hoppers for rotational movement and meshing with an associated one of said auger elements for rotational movement when said associated auger is actuated.

13. The apparatus of claim 12 in which said front wall and side walls include transparent material defining front and side windows, said agitator wheels mounted for rotational movement in a plane essentially co-planer to said side windows with the center of rotation being within said lower section.

14. The apparatus of claim 13 in which said lower section of each hopper has a sloping front wall merging with said upper section front wall, said sloping front wall positioned within about three to five times the width of an average coffee bean width.

15. The apparatus of claim 14 in which said side windows have a trapezoidal shape with the lower edges thereof sloping downward toward said upper section front wall such that the greatest depth of said side windows bounds a region of said hopper between the periphery of said agitator wheel and the upper section front wall.

16. The apparatus of claim 6 including at least one auger motor in an enclosed housing and transmission means operatively connecting said auger elements to said auger motor.

17. The apparatus of claim 16 in which said auger motor housing houses a plurality of auger motors, each associated with one of said auger elements.

18. The apparatus of claim 17 in which said transmission means comprises a plurality of drive shafts, each connected to an associated one of said auger motors through an opening in a wall of said auger housing and coupled to an associated one of said auger elements.

19. The apparatus of claim 6 further including control means for selecting one of said auger elements for actuation and for selecting one of a plurality of time periods of operation of said selected auger element thereby providing a quantity of coffee beans to said grinder proportional to said selected time period, said hot water making and distributing means responsive to said control means for selecting and delivering one of a plurality of predetermined amounts of hot water to said region.

20. The apparatus of claim 19 including an outwardly extending member positioned below said hoppers and auger elements, said member having a lower surface upon which said brew basket holding means is mounted and further defining openings into said region above said brewer basket for delivery therein of coffee and hot water.

21. The apparatus of claim 19 in which said control means activates said grinder for a predetermined time period and activates said hot water making and delivery means following said predetermined time period.

22. The apparatus of claim 1 in which said hot water making and distributing means includes means for heating water in said tank, said apparatus further including control means for deactivating said means for heating when said grinder is actuated and activating said means for heataing when said grinder is deactivated.

23. The apparatus of claim 1 wherein said dispensing means includes a plurality of hoppers, said apparatus further including
(i) hopper selection control means for selecting coffee beans from one of said hoppers,
(ii) coffee bean amount selection means for selecting from one of plurality of predetermined amounts, said portioning means responsive to said coffee bean amount selection means for delivering said selected amount to said grinder, and
said hot water making and delivering means responsive to said coffee bean selection means for selecting from one of plurality of predetermined volumes of hot water and delivering said preselected volume to said region.

24. The apparatus of claim 1 including
(i) control means for sequentially activating said dispensing means and the delivery of hot water by said hot water making and delivery means and
(ii) brew only switch means for maintaining said dispensing means in a de-active state when said switch means is open thereby only hot water is delivered to said basket.

25. A coffee dispensing and brewing apparatus comprising
(a) a hopper for holding coffee;
(b) a brew basket for receiving coffee and hot water;
(c) means communicating with said hopper for portioning coffee in predetermined amounts and delivering said predetermined amount to said brew basket;
(d) coffee amount selection means for selecting a predetermined amount of coffee from one of a plurality of predetermined amounts, said coffee portioning means responsive to said selection means portioning coffee in said selected predetermined amount and delivering said selected predetermined amount to said brew basket; and
(e) hot water means for making hot water and selecting- and delivering one of a predetermined volumes of hot water to said brew basket in response to the selection of said coffee selection means.

26. The apparatus of claim 25 including a plurality of hoppers, said portioning means responsive to a hopper selection means for portioning coffee from a selected one of said hoppers.

27. The apparatus of claim 26 wherein said hoppers hold coffee beans, said portioning means includes a plurality of auger elements each coupled to an auger motor, each auger element associated with one of said hoppers, a selected one of said augers in response to said hopper selection means rotating for a predetermined time period determined by said coffee amount selection means and moving said selected predetermined amount of coffee from said selected hopper to a grinder whereby said brew basket receives said selected predetermined amount of coffee in the form of ground coffee.

28. A coffee making apparatus comprising
(a) a hopper for holding coffee beans;
(b) a coffee grinder receiving coffee beans from said hopper;
(c) a coffee brewer means for brewing coffee from ground coffee received from said grinder, said brewer including a tank for holding water and a heating element for heating said water to a predetermined temperature, said grinder and said heating element connected to the same electrical power source; and (d) means responsive to the actuation of said grinder for disconnecting said heating element from the electrical power source and reconnecting said heating element when said grinder is deenergized.

29. An apparatus for the holding of coffee beans for display and subsequent grinding comprising
(a) at least one hopper for the holding and displaying of coffee beans;
(b) a grinder for grinding coffee beans into ground coffee for subsequent brewing;
(c) a transporting means for receiving beans from said hopper and transporting the received beans to said grinder;
(d) an agitating wheel mounted for rotational movement within said hopper and being driven by said transporting means, said agitating wheel having projections for the movement of the coffee beans when said wheel is rotated, said hopper having an upper section defined by parallel front and back walls and parallel side walls with windows and a lower section having converging front, back and side walls defining a funnel portion communicating with said transporting means, and wherein a major portion of the circumference of said agitating wheel is positioned below the lower edges of said windows.

30. The apparatus of claim 29 in which the closest point of approach of the circumference of said agitating wheel is spaced no more than 3 to five times the distance of an average beans width from said front wall of said lower section.

31. The apparatus of claim 30 in which said side windows have a trapezoidal shape with the depth thereof along the front thereof being greater than the depth along the rear.

32. The apparatus of claim 31 including a pair of hoppers separated by a common transparent dividing wall, said coffee bean transporting means being a pair of auger elements, each auger element communicating with an associated one of said hoppers, and a pair of agitating wheels each mounted for rotational movement in an associated one of said hoppers and driven by an associated one of said auger elements.

33. A combination multi-hopper coffee bean grinding and brewing apparatus comprising
(a) a plurality of component modules, each module being releasable secured to neighboring module;
(b) a first module of said plurality of modules housing
(i) a plurality of hoppers each holding a supply of coffee beans,
(ii) a plurality of auger elements each associated with a respective hopper, a selected one of said auger elements moving a preselected quantity of said coffee beans from said associated hopper when said supply of coffee beans therein has been selected for use;
(c) a second module of said plurality of modules releasable secured to said first module, said second module housing
(i) at least one auger motor and
(ii) power transmission means couple for rotating a selected one of said augers when one of said hoppers associated with said auger element has been selected for use and moving a preselected quantity of beans; and (d) a third module of said plurality of modules releasable secured to said second module, said third module housing
(i) a coffee bean grinder operative during a grinding cycle for receiving said preselected quantity of beans and a grinder motor for driving said grinder,
(ii) a brew basket holding means for releasable holding a brew basket adjacent a region receiving said preselected quantity of coffee in the form of coffee grounds during said grinding cycle, and
(iii) a hot water making and distributing means for distributing hot water during a brewing cycle to said region during a brewing cycle proportional to the selected quantity of beans.

34. The apparatus of claim 33 in which said first module has
an upper section defining said plurality of hoppers and
a lower section defining a plurality of chambers each housing an associated one of said auger element and a plurality of funnel portions each associated with one of said hoppers and guiding said selected quantity of beans from said associated hopper to said associated auger chambers.

35. The apparatus of claim 34 including a means for guiding said selected quantity of beans received from said selected auger element directly to said grinder.

36. The apparatus of claim 35 in which said guiding means is a bean transition chamber feeding an enclosed spout chamber directly connected to said grinder.

37. The apparatus of claim 34 including coffee bean transmitting means for transporting beans from said auger elements to said grinder, said grinder motor disposed at a right angle to said grinder and a right angle transmission drive operatively connecting said grinder to said grinder motor.

38. The apparatus of claim 33 in which said first module has
an upper section defined by front, back and side walls and at least one dividing wall dividing said upper section into said plurality of hoppers,
a lower section defining a plurality of funnel portions each associated with one of said hoppers, each of said funnel portions communicating an associated one of said hoppers to an associated one of said auger elements, and
a plurality of agitator wheels each mounted for rotational movement in an associated hopper one of said hoppers and meshing with an associated one of said auger elements for rotational movement when said associated auger is actuated.

39. A coffee dispensing and brewing apparatus comprising
(a) coffee dispensing means for dispensing a predetermined amount of coffee to a brew basket, said coffee dispensing means including
(i) a hopper for holding a supply of coffee beans,
(ii) auger means communicating with said hopper for portioning coffee beans in a predetermined amount, and
(iii) a grinder for receiving and grinding said predetermined amount into ground coffee;
(b) a brew basket holding means for releasably holding said brew basket in a region adjacent a passageway to said grinder whereby said brew basket receives said predetermined amount of coffee in ground coffee form;

(c) hot water making and delivery means for distributing a predetermined volume of hot water to said region during a brewing cycle; and (d) slide valve control means, said valve means being a slide valve connected to a solenoid, said solenoid responsive to said control means and operative to close communication between said brew basket and said dispensing means before said brewing cycle commences.

40. The apparatus of claim 39 in which said slide valve is connected to a plunger of said solenoid and moves in the same plane of said solenoid plunger.

41. The apparatus of claim 40 in which said coffee dispensing means includes an upper section defining a plurality of hoppers each for holding a supply of coffee beans.

42. The apparatus of claim 41 in which said dispensing means has a lower section integral with said upper section, said lower section defining a plurality of chambers each housing an associated one of said auger elements and a plurality of funnel portions for guiding said predetermined amount of beans from said associated hopper to said associated auger element chamber.

43. A coffee dispensing and brewing apparatus comprising (a) a hopper for holding coffee;

(b) a brew basket for receiving coffee and hot water;

(c) means communicating with said hopper for portioning coffee in predetermined amounts and delivering said predetermined amount to said brew basket;

(d) means for distributing a predetermined volume of hot water to said brew basket during a brewing cycle, (e) control switch means for generating a signal when a cycle is initiated, said portioning means responsive to said signal for initiating portioning and delivering of said coffee and said hot water distributing means responsive to said signal for thereafter distributing hot water to said brew basket; and (f) brew only means for selectively interrupting said signal to said portioning means thereby only hot water is distributed to said brew basket.

44. The apparatus of claim 43 in which there are a plurality of hoppers.

45. The apparatus of claim 44 in which said hoppers hold coffee beans, said portioning device further comprising a means for transporting coffee from a selected one of said hoppers and a grinder for receiving coffee beans from said transporting means, grinding said beans into ground coffee, and delivering said ground coffee to s id brew basket.

46. The apparatus of claim 45 in which said transporting means is a plurality of auger elements and motors for driving said auger elements, each of said auger elements associated with one of said hoppers.

* * * * *

UNITED STATES PATENT AND TRADEMARK OFFICE
CERTIFICATE OF CORRECTION

PATENT NO. : 5,241,898

DATED : Sept. 7, 1993

INVENTOR(S) : Brian D. Newnan

It is certified that error appears in the above-identified patent and that said Letters Patent is hereby corrected as shown below:

In column 17, line 64, insert after "couple"
        --d to said augers--

Signed and Sealed this

Twelfth Day of April, 1994

Attest:

BRUCE LEHMAN

Attesting Officer     Commissioner of Patents and Trademarks

REEXAMINATION CERTIFICATE (3725th)
United States Patent [19]
Newman

[11] B1 5,241,898
[45] Certificate Issued Feb. 9, 1999

[54] COFFEE DISPENSER AND BREWER APPARATUS

[75] Inventor: Brian D. Newman, Louisville, Ky.

[73] Assignee: Grindmaster Corporation, Louisville, Ky.

Reexamination Request:
No. 90/004,988, May 22, 1998

Reexamination Certificate for:
| | |
|---|---|
| Patent No.: | 5,241,898 |
| Issued: | Sep. 7, 1993 |
| Appl. No.: | 951,674 |
| Filed: | Sep. 25, 1992 |

Certificate of Correction issued Apr. 12, 1994.

[51] Int. Cl.$^6$ .................................................. A47J 31/42
[52] U.S. Cl. .................. 99/280; 99/285; 99/286; 99/287; 99/289 R; 99/300; 241/100; 241/225
[58] Field of Search ................ 99/286, 280, 281, 99/282, 283, 285, 287, 289 R, 290, 300, 299, 302 R, 304, 305; 241/100, 222, 225; 426/433

[56] References Cited

U.S. PATENT DOCUMENTS

| | | |
|---|---|---|
| 3,327,615 | 6/1967 | Swan . |
| 3,871,273 | 3/1975 | Hsieh . |
| 4,172,413 | 10/1979 | Roseberry . |

*Primary Examiner*—Reginald L. Alexander

[57] ABSTRACT

A coffee dispensing and brewing apparatus in accordance with one embodiment of the present invention comprises components for dispensing a predetermined amount of coffee to a brew basket, the components including a hopper for holding a supply of coffee beans and an auger device communicating with the hopper for portioning coffee beans in a predetermined amount to a coffee grinder. The apparatus further includes a brew basket holding assembly for releasably holding the brew basket in a region adjacent a passageway to the grinder and a hot water making and delivery system for distributing a predetermined volume of hot water from a hot water holding tank to the region during a brewing cycle. The grinder motor has a right angle power transmission that couples the moter to the grinder with the motor being located below the grinder and adjacent a vertical side of the holding tank.

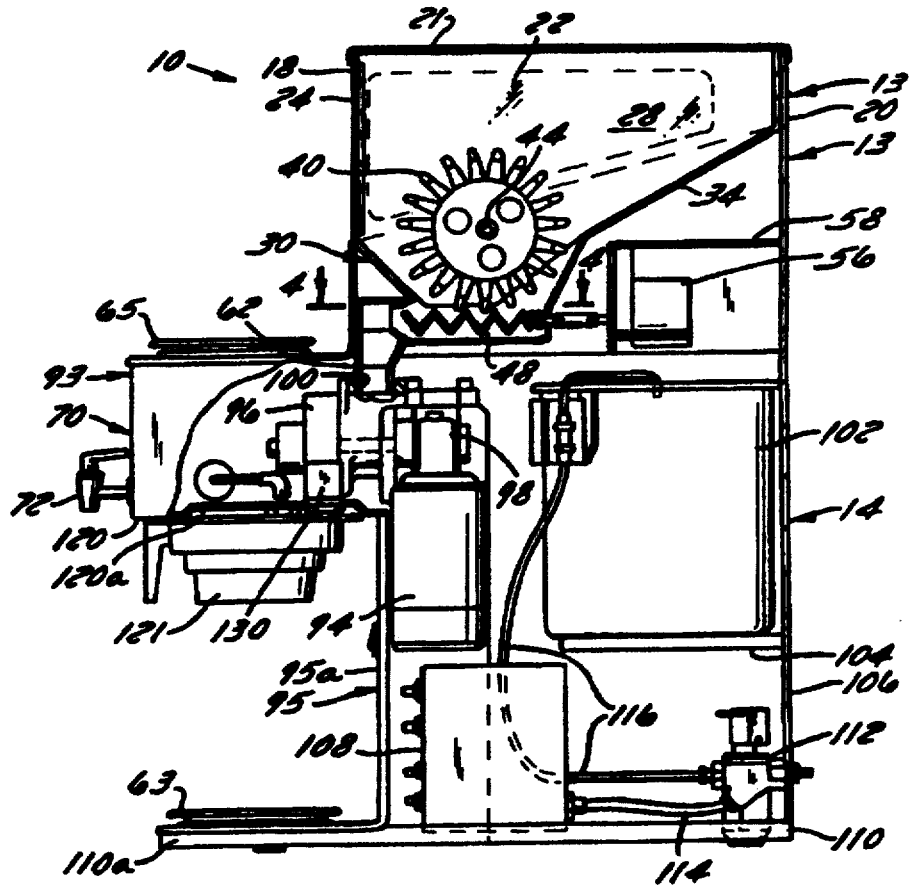

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–24 and 28–46 is confirmed.

Claims 25, 26 and 27 are determined to be patentable as amended.

25. A coffee dispensing and brewing apparatus comprising
   (a) a hopper for holding coffee *beans*;
   (b) a brew basket for receiving *ground* coffee and hot water;
   (c) [means communicating with said hopper for portioning coffee in a predetermined amounts] *a grinder for grinding coffee beans into said ground coffee* and delivering said [predetermined amount] *ground coffee* to said brew basket, *said grinder connected to a first motor*;
   (d) [coffee amount selection means for selecting a predetermined amount of coffee from one of a plurality of predetermined amounts, said coffee portioning means responsive to said selection means portioning coffee in said selected predetermined amount and delivering said predetermined amount to said brew basket] *control means for selecting one of a plurality of predetermined amounts of ground coffee to be brewed in said brew basket*; [and]
   (e) *an auger element connected to a second motor and responsive to said control means for portioning said coffee beans from said hopper and delivering said coffee beans to said grinder in an amount sufficient to be ground into said one predetermined amount; and*
   [(e)](*f*) hot water means for making hot water and selecting and delivering one of a predetermined volumes of hot water to said brew basket in response to the selection of said [said coffee selection means] *control means, said one predetermined volume corresponding to said one predetermined amount.*

26. The apparatus of claim 25 including a plurality of hoppers, [said portioning means responsive to a hopper selection means] *said control means selecting one of said hoppers* for portioning coffee from a selected one of said hoppers.

27. The apparatus of claim 26 [wherein said hoppers hold coffee beans, said portioning means includes] *including* a plurality of auger elements each coupled to [an] *one of a plurality of* auger motors, each auger element associated with one of said hoppers, a selected one of said augers in response to said [hopper selection] *control* means rotating for a predetermined time period determined by said [coffee amount selection] *control* means and moving said [selected predetermined amount of] coffee *beans* from said selected hopper to grinder whereby said brew basket receives said selected predetermined amount of *ground* coffee [in the form of a ground coffee].

* * * * *